(12) United States Patent
Niitsuma et al.

(10) Patent No.: US 9,282,731 B2
(45) Date of Patent: Mar. 15, 2016

(54) DUAL-BEARING REEL SPOOL BRAKING DEVICE

(71) Applicant: Shimano Inc., Sakai, Osaka (JP)

(72) Inventors: Akira Niitsuma, Osaka (JP); Yuzo Shimano, Osaka (JP)

(73) Assignee: Shimano Inc., Osaka (JP)

( * ) Notice: Subject to any disclaimer, the term of this patent is extended or adjusted under 35 U.S.C. 154(b) by 46 days.

(21) Appl. No.: 14/245,148

(22) Filed: Apr. 4, 2014

(65) Prior Publication Data

US 2014/0332616 A1 Nov. 13, 2014

(30) Foreign Application Priority Data

May 10, 2013 (JP) ................................. 2013-100113

(51) Int. Cl.
*A01K 89/01* (2006.01)
*A01K 89/0155* (2006.01)

(52) U.S. Cl.
CPC .................. *A01K 89/0155* (2013.01)

(58) Field of Classification Search
CPC ............... A01K 89/0155; A01K 89/01557; A01K 89/0182
See application file for complete search history.

(56) References Cited

U.S. PATENT DOCUMENTS

| 2,290,662 | A | * | 7/1942 | Willison | 242/289 |
| 4,390,140 | A | * | 6/1983 | Karlsson et al. | 242/289 |
| 5,865,387 | A | * | 2/1999 | Hirano | 242/289 |
| 6,126,105 | A | * | 10/2000 | Yamaguchi | 242/288 |
| 6,364,230 | B1 | * | 4/2002 | Kawasaki | 242/289 |
| 6,474,580 | B1 | * | 11/2002 | Hirayama | 242/289 |
| 2012/0248233 | A1 | * | 10/2012 | Saito et al. | 242/289 |
| 2013/0181081 | A1 | * | 7/2013 | Niitsuma | 242/289 |

FOREIGN PATENT DOCUMENTS

JP 2013-86 A 1/2013

* cited by examiner

*Primary Examiner* — Emmanuel M Marcelo
(74) *Attorney, Agent, or Firm* — Global IP Counselors

(57) ABSTRACT

A present dual-bearing reel spool braking device is configured to apply a braking force to a spool that is rotatably mounted on a reel body with a centrifugal force. The spool braking device includes a rotating member, a brake shoe, a brake drum, and a selective fixing member. The rotating member rotates in conjunction with the rotation of the spool. The brake shoe is supported by a rotating member so as to be pivotal between a braking position where the brakes are applied to the spool with a centrifugal force and a non-braking position where a non-braking rotation of the spool is allowed. The brake drum is configured to come into contact with the brake shoe. The selective fixing member is mounted to the rotating member. The selective fixing member selectively fixes the brake shoe to the non-braking position by selectively engaging with the brake shoe.

14 Claims, 17 Drawing Sheets

DUAL-BEARING REEL SPOOL BRAKING DEVICE

CROSS-REFERENCE TO RELATED APPLICATIONS

This application claims priority to Japanese Patent Application No. 2013-100113, filed on May 10, 2013. The entire disclosure of Japanese Patent Application No. 2013-100113 is hereby incorporated herein by reference.

BACKGROUND

1. Field of Invention

The present invention generally relates to a dual-bearing reel spool braking device. More specifically, the present invention relates to a dual-bearing reel spool braking device that applies braking force to a spool that is rotatably mounted on a reel body.

2. Background Information

In a dual-bearing reel that is used for casting, in order to prevent backlash, a braking force is generally applied to the spool. A known spool braking device of this type is a spool braking device that applies braking force to the spool using centrifugal force that is generated by the rotation of the spool, in which this braking force is adjustable from the outside of the reel body. However, backlash is generated when the rotational speed of the spool is faster than the line delivering speed during casting.

A conventional spool braking device that applies a braking force to a spool by pivoting a brake shoe and that causes the brake shoe to come into contact with the brake drum has been disclosed in Japanese Laid-Open Patent Publication No. 2013-00086.

Specifically, in this spool braking device, the brake shoe pivots in conjunction with the rotation of the spool and comes into contact with the brake drum. More specifically, a bracket is fixed to the spool shaft and a pin is installed on the bracket. The brake shoe is slidably mounted on the pin. Thus, when the spool rotates, the brake shoe pivots around the pin and comes into contact with the brake drum due to the centrifugal force. In this way, the braking force is applied to the spool. Additionally, a recess (a switching recess) is installed on the brake shoe, and a protrusion (a switching protrusion) is installed on the bracket. When the brake shoe is inoperable, the recess of the brake shoe is elastically engaged with the protrusion of the bracket. Thus, the posture of the brake shoe is retained so that the brake shoe will not operate.

SUMMARY

In a conventional spool braking device, in the operable state of the brake shoe, the brake shoe slides around the pin and can come into contact the brake drum. Additionally, when switching the brake shoe from the inoperable state to the operable state, the recess of the brake shoe is elastically engaged with the protrusion of the bracket. Specifically, an angler elastically engages each of the recesses of a plurality of brake shoes individually with a protrusion of the bracket. For this reason, there is the problem that the more numerous the number of brake shoes that the angler makes inoperable, the more cumbersome the operation of elastically engaging the brake shoe to the bracket becomes. Additionally, since the brake shoe is a small member, individually selecting this brake shoe is difficult. Furthermore, because the brake shoe is a small member, there is also the problem that the elastic engagement between the recess of the brake shoe and the protrusion of the bracket may easily disengage. The operational problems mentioned above are problems that also occur when changing the brake shoe from the operable state to the inoperable state.

The present invention was made in light of problems like those mentioned above, and the object of the present invention is to facilitate setting the operable state and the inoperable state of the brake shoe.

The dual-bearing reel spool braking device according to the first aspect applies braking force to the spool that is rotatably mounted on a reel body with centrifugal force. The present spool braking device comprises a rotating member, a brake shoe, a brake drum, and a selective fixing member. The rotating member rotates in conjunction with the rotation of the spool. The brake shoe is supported by a rotating member in order to be movable between a braking position where the brakes are applied to the spool with centrifugal force and a non-braking position where a non-braking rotation of the spool is allowed. The brake drum can come into contact with the brake shoe. The selective fixing member is mounted to the rotating member. The selective fixing member selectively fixes the brake shoe in the non-braking position by selectively engaging with the brake shoe.

In the present spool braking device, the brake shoe is supported by a rotating member in order to be movable between the braking position and the non-braking position. For example, when the selective fixing member is disengaged with the brake shoe, the brake shoe comes into contact with the brake drum in the braking position in conjunction with the rotation of the spool and the rotating member. On the other hand, when the selective fixing member is engaged with a certain brake shoe, this brake shoe is fixed in the non-braking position and is unable to come into contact with the brake drum. Additionally, even if the selective fixing member is engaged with a certain brake shoe, the other brake shoes that are disengaged with the selective fixing member can come into contact with the brake drum in the braking position.

In this way, in the present spool braking device, the brake shoe can be selectively fixed and made inoperable in the braking position by operating the selective fixing member. Additionally, by operating the selective fixing member, the brake shoe can be selectively operated and made operable in the non-braking position. In other words, in the present spool braking device, the operable state and the inoperable state of the brake shoe can be easily set with the selective fixing member.

Specifically, even if the number of brake shoes is numerous, the brake shoe can be easily fixed with only the selective fixing member. Furthermore, even if the brake shoe is a small member, the brake shoe can be easily selected with only the selective fixing member. Also, by engaging the selective fixing member with the brake shoe, the brake shoe can be reliably fixed to the rotating member.

A dual-bearing reel spool braking device according to the second aspect comprises the spool braking device recited in the first aspect, with the selective fixing member being rotatably mounted to the rotating member.

In this case, by rotating the selective fixing member with respect to the rotating member, the brake shoe can be easily selectively fixed. In other words, by rotating the selective fixing member with respect to the rotating member, the fixing of the brake shoe can be easily released.

A dual-bearing reel spool braking device according to the third aspect comprises the spool braking device recited in the first aspect, with the selective fixing member being movably mounted to the rotating member in a direction along the rotational axis of the rotating member.

In this case, by moving the selective fixing member in a direction along the rotational axis of the rotating member, the brake shoe can be easily selectively fixed. In other words, by moving the selective fixing member in a direction along the above-described rotational axis with respect to the rotating member, the fixing of the brake shoe can be easily released.

A dual-bearing reel spool braking device according to the fourth aspect comprises the spool braking device recited in any one of the first to the third aspects, with the selective fixing member comprising a main body section that is mounted to the rotating member and an engaging section that is installed on the main body section and that can selectively engage with the brake shoe.

In this case, by selectively engaging the engaging section of the selective fixing member to the brake shoe, the brake shoe can be easily made inoperable. Additionally, by disengaging the engaging section of the selective fixing member, the brake shoe can be easily made operable.

A dual-bearing reel spool braking device according to the fifth aspect comprises the spool braking device recited in any one of the first to the fourth aspects and further comprises a positioning structure for positioning the selective fixing member with respect to the rotating member.

In this case, the selective fixing member can be easily positioned with the positioning structure. In other words, the state in which the selective fixing member is engaged with the brake shoe can be reliably maintained.

A dual-bearing reel spool braking device according to the sixth aspect comprises the spool braking device recited in the fifth aspect, with the positioning structure comprising a positioning recess that is installed on either the rotating member or the selective fixing member and a positioning protrusion that is installed on the other member, either the rotating member or the selective fixing member, and that engages with the positioning recess.

In this case, in the positioning structure, by engaging the positioning recess and the positioning protrusion, the selective fixing member can be easily positioned. In other words, the state in which the selective fixing member is engaged with the brake shoe can be reliably maintained.

A dual-bearing reel spool braking device according to the seventh aspect comprises the spool braking device recited in any one of the first to the sixth aspects, with the selective fixing member comprising a guide part that guides the brake shoe to the non-braking position.

In this case, since the engaging section has a guide part to guide the brake shoe to the non-braking position, the engaging section can be easily engaged with the brake shoe in the case that the selective fixing member is operated.

A dual-bearing reel spool braking device according to the eighth aspect comprises the spool braking device recited in any one of the first to the seventh aspects, with the brake shoe comprising a first brake shoe and a second brake shoe. The selective fixing member selectively engages with at least one of the first brake shoe and the second brake shoe.

In this case, if the selective fixing member engages with the first brake shoe, the first brake shoe is fixed in the non-braking position. Additionally, if the selective fixing member engages with the second brake shoe, the second brake shoe is fixed in the non-braking position. Furthermore, if the selective fixing member engages with the first brake shoe and the second brake shoe, the first brake shoe and the second brake shoe are fixed in the non-braking position. A brake shoe with which a selective fixing member is engaged in this way becomes inoperable in the non-braking position. On the other hand, a brake shoe from which the selective fixing member is disengaged is operable in the braking position. In this way, with the present spool braking device, the operable state and the inoperable state of the brake shoe can be easily set by the selective fixing member.

A dual-bearing reel spool braking device according to the ninth aspect comprises the spool braking device recited in the eighth aspect, with the engaging section being configured by a first engaging section and a second engaging section. The first engaging section can engage with at least one of the first brake shoe and the second brake shoe. The second engaging section can engage with at least one of the first brake shoe and the second brake shoe.

In this case, by engaging the engaging sections (the first engaging section/the second engaging section) individually with the first brake shoe and the second brake shoe, the brake shoe can be easily made inoperable. By releasing the engagement of the engaging sections (the first engaging section/the second engaging section) and the brake shoes (the first brake shoe/the second brake shoe), the brake shoe can be easily made operable.

A dual-bearing reel spool braking device according to the tenth aspect comprises the spool braking device recited in the ninth aspect, with the first engaging section engaging with both the first brake shoe and the second brake shoe.

In this case, the two brake shoes (the first brake shoe and the second brake shoe) can be fixed to be inoperable simultaneously by one engaging section (the first engaging section). With this, depending on the situation, the two engaging sections (the first engaging section and the second engaging section) can be individually engaged with the first brake shoe and the second brake shoe, or both the first brake shoe and the second brake shoe can be simultaneously engaged with just one engaging section (the first engaging section).

A dual-bearing reel spool braking device according to the eleventh aspect comprises the spool braking device recited in the ninth or tenth aspects, with the first engaging section being longer than the second engaging section in the direction that the rotating member rotates.

In this case, since the first engaging section is formed to be longer than the second engaging section, even if the selective fixing member is rotated in a state where, for example, the first engaging section is engaged with the first brake shoe, the second engaging section can be engaged with the second brake shoe while in a state maintaining the engagement between the first engaging section and the first brake shoe.

A dual-bearing reel spool braking device according to the twelfth aspect comprises the spool braking device recited in the ninth or tenth aspects, with the first engaging section being longer than the second engaging section in the direction along the rotational axis.

In this case, since the first engaging section is formed to be longer than the second engaging section, even if the selective fixing member is moved in a state where, for example, the first engaging section is engaged with the first brake shoe, the second engaging section can be engaged with the second brake shoe while in a state maintaining the engagement between the first engaging section and the first brake shoe.

According to the present invention, the operable state and the inoperable state of the brake shoe can be easily set.

DETAILED DESCRIPTION OF THE INVENTION

Figure 1:
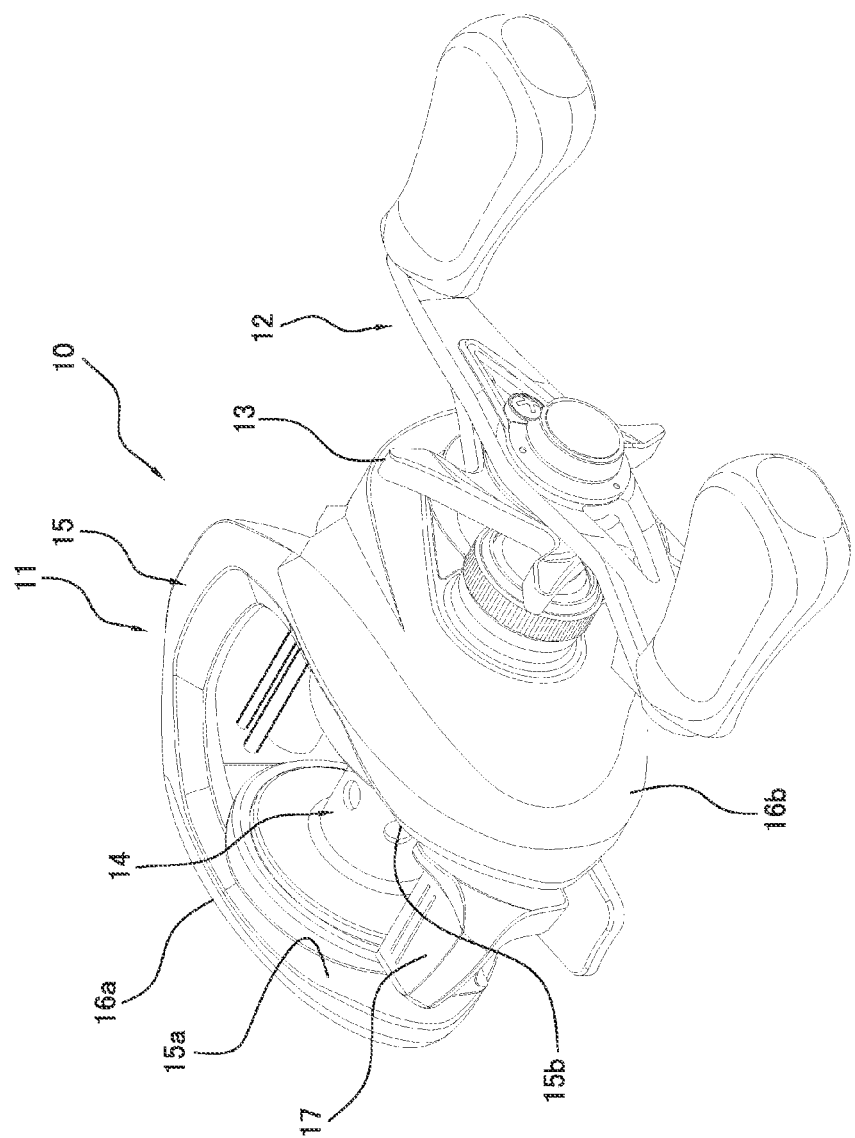
FIG. 1 is an oblique view of a dual-bearing reel according to the first embodiment of the present invention.
Figure 2:
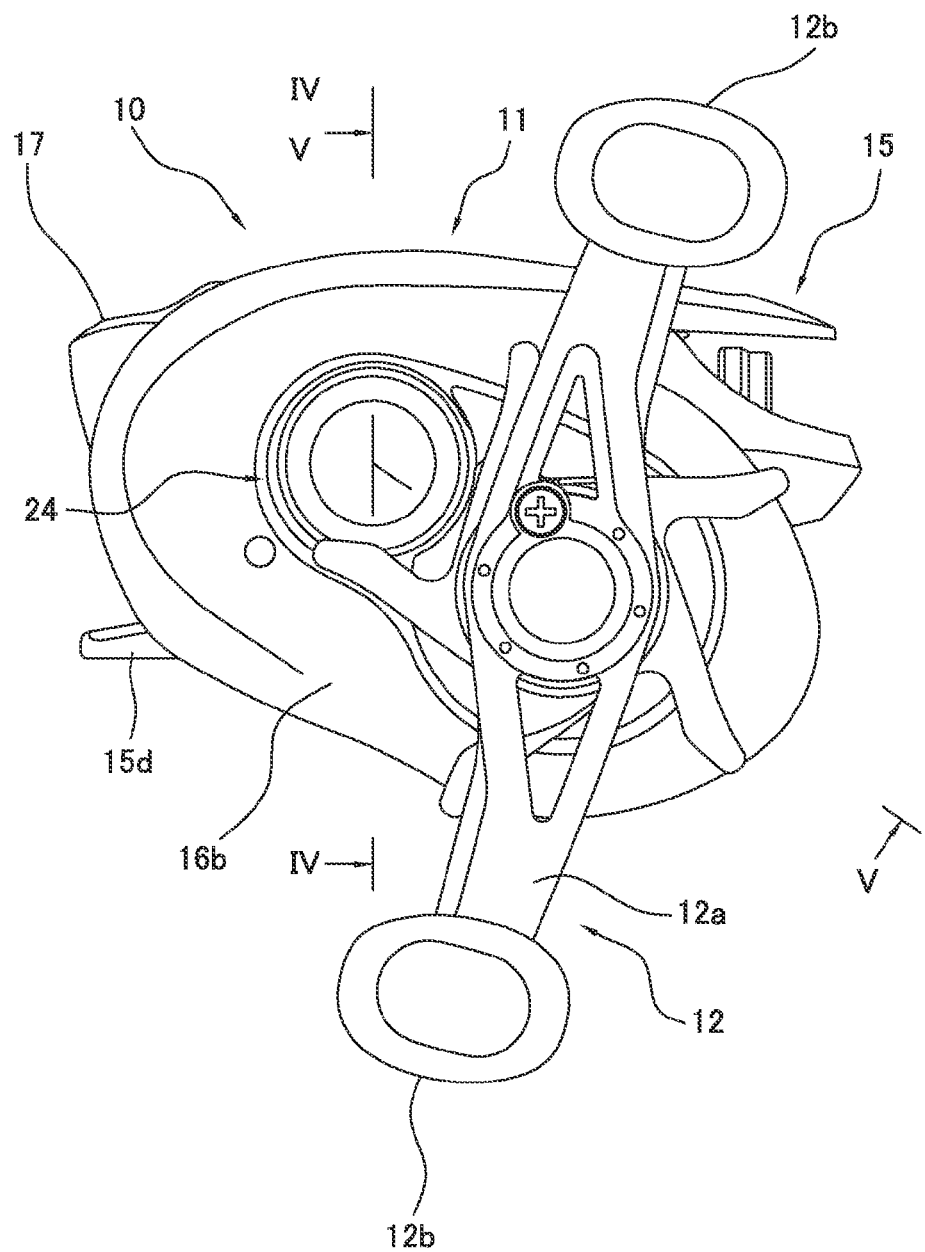
FIG. 2 is a right side view of the dual-bearing reel of FIG. 1.
Figure 3:
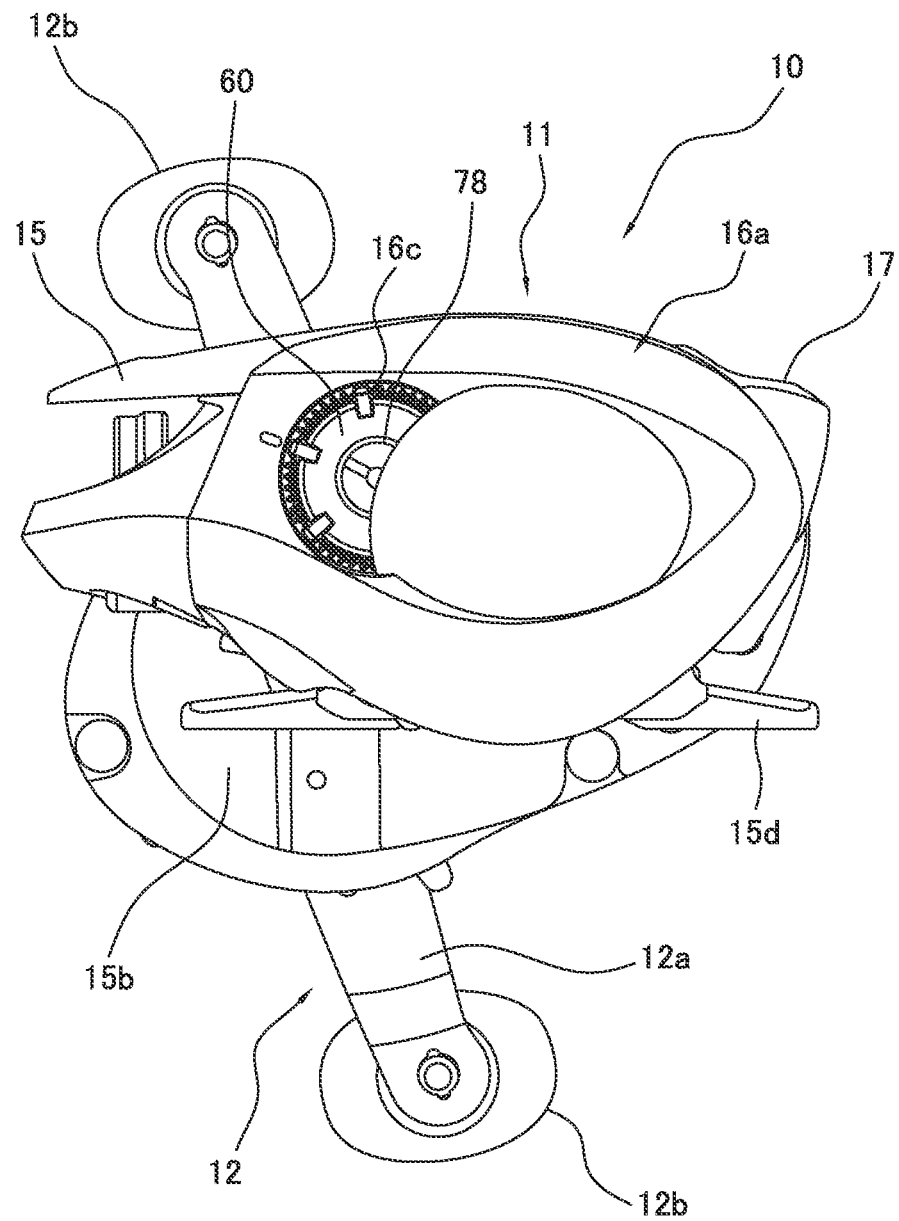
FIG. 3 is a left side view of the dual-bearing reel of FIG. 1.

The dual-bearing reel 10 according to one embodiment of the present invention, as shown in FIGS. 1 to 5, is a dual-bearing reel for bait casting. This reel comprises a reel body 11, a spool rotary drive handle 12 that is disposed on the side of the reel body 11, a star drag 13 for adjusting the drag that is disposed on the reel body 11 side of the handle 12, a spool 14 for winding line, and a spool shaft 20 to which is mounted the spool 14.

Figure 5:
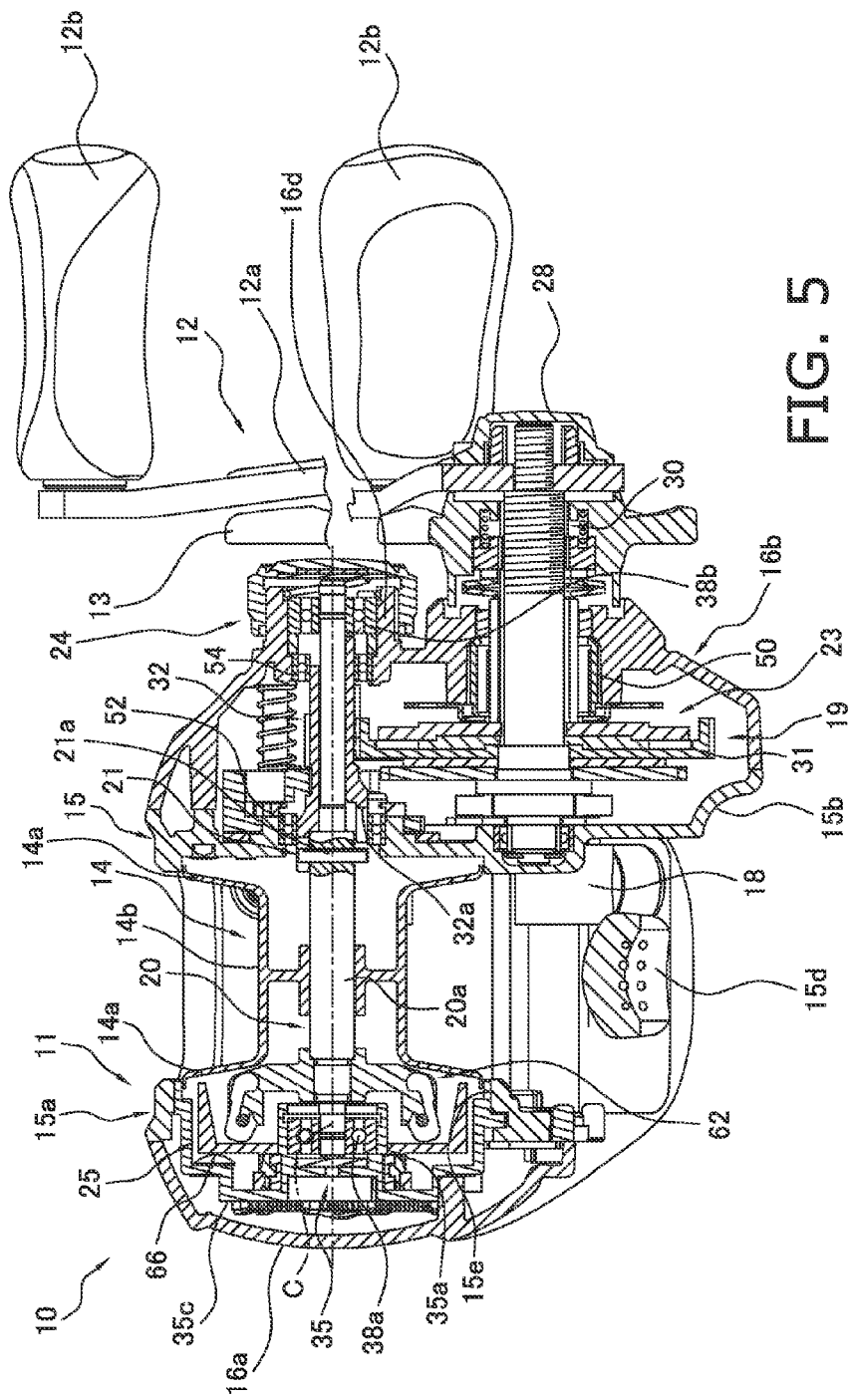
FIG. 5 is a cross-sectional diagram of the section line V-V in FIG. 2.

The handle 12 is a double handle type, comprising an arm section 12a and grips 12b that are rotatably mounted on both ends of the arm section 12a. The arm section 12a, as shown in FIG. 5, is non-rotatably mounted on the tip of the drive shaft 30 and is fastened to the drive shaft 30 with a nut 28. The handle 12 is disposed on the second side cover 16b side mentioned below.

Figure 4:
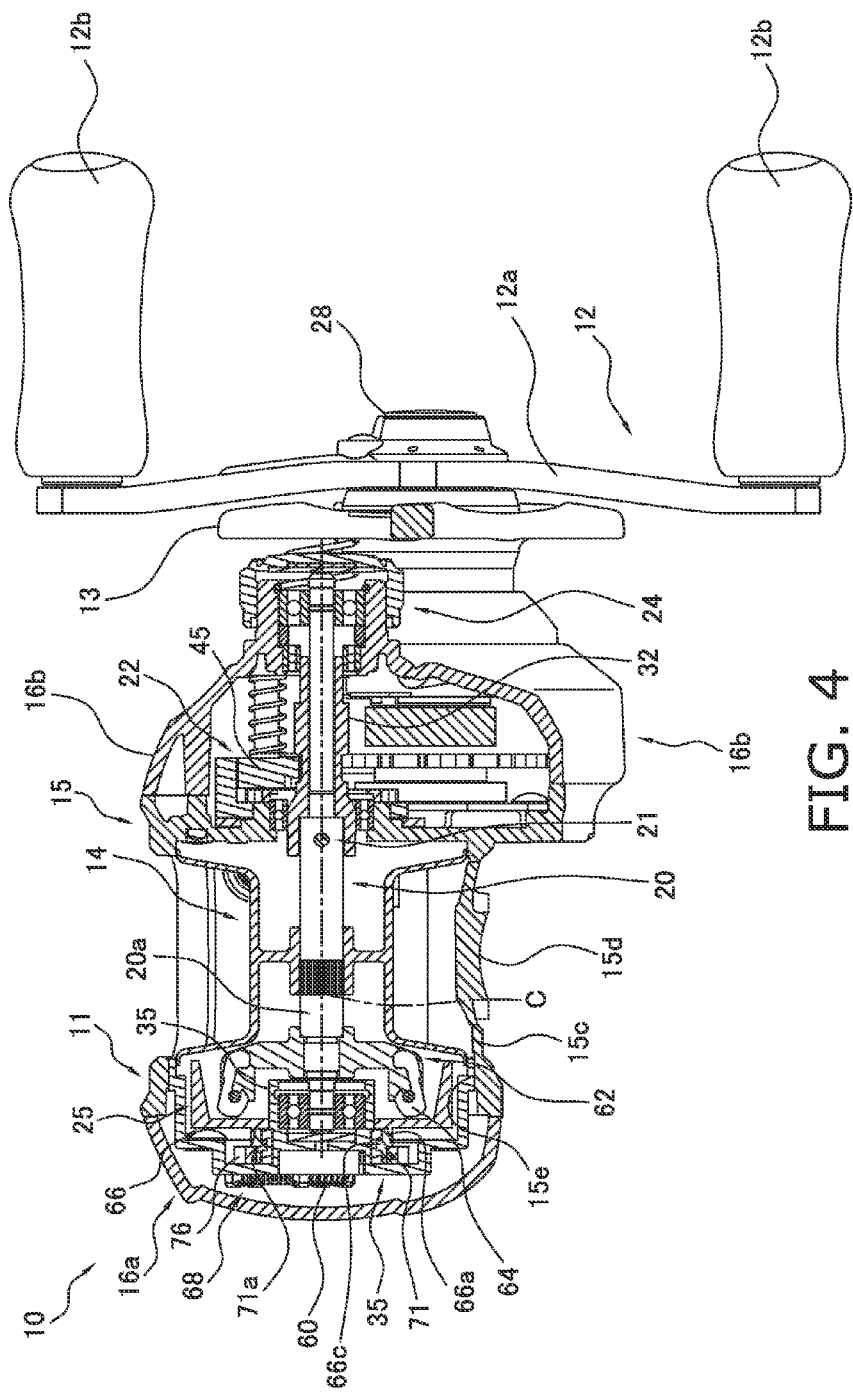
FIG. 4 is a cross-sectional diagram of the section line IV-IV in FIG. 2.

As shown in FIG. 4 and FIG. 5, the reel body 11 is, for example, a light metallic member such as magnesium alloy and comprises a frame 15, a first side cover 16a and a second side cover 16b that are mounted on both sides of the frame 15, and a shaft support portion 35. A spool 14 via a spool shaft 20 is rotatably mounted inside of the reel body 11. As shown in FIG. 5, the first side cover 16a is detachably mounted to a first side plate 15a and covers the outside of the first side plate 15a. The second side cover 16b is fixed via a screw to the second side plate 15b and covers the outside of the second side plate 15b.

As shown in FIGS. 1 to 5, disposed in the frame 15 are a spool 14, a clutch operating member 17 that is where the thumb is placed when using the thumb, and a level winding mechanism 18 for evenly winding the fishing line into the spool 14.

Additionally, as shown in FIG. 4 and FIG. 5, disposed between the frame 15 and the second side cover 16b are a gear mechanism 19, a clutch mechanism 21, a clutch control mechanism 22, a drag mechanism 23, and a casting control mechanism 24. The gear mechanism 19 is installed to transmit the torque from the handle 12 to the spool 14 and the level winding mechanism 18. The clutch mechanism 21 is installed to couple and to cut off the spool 14 and the handle 12. A clutch control mechanism 22 is installed to control the clutch mechanism 21 according to the operation of the clutch operating member 17.

The drag mechanism 23 is installed to control the rotation in the line delivering direction of the spool 14. The casting control mechanism 24 is installed to adjust the resistive force during the rotation of the spool 14. Additionally, a spool braking device 25 that uses centrifugal force for suppressing backlash during casting is disposed between the frame 15 and the first side cover 16a.

The frame 15, as shown in FIG. 4 and FIG. 5, comprises a first side plate 15a, a second side plate 15b that is disposed to mutually oppose the first side plate 15a with a predefined space in between, and a plurality of (for example, 3) coupling sections 15c that integrally couple the first side plate 15a and the second side plate 15b in the front and back as well as the lower part. In the coupling section 15c, a fishing rod mounting portion 15d is integrally formed in the lower side for mounting the fishing rod. The first side plate 15a comprises an opening portion 15e that is circularly formed with a shaft core C of the spool shaft 20 as the center in the center part. A shaft support portion 35 is detachably coupled with the opening portion 15e.

Figure 6:
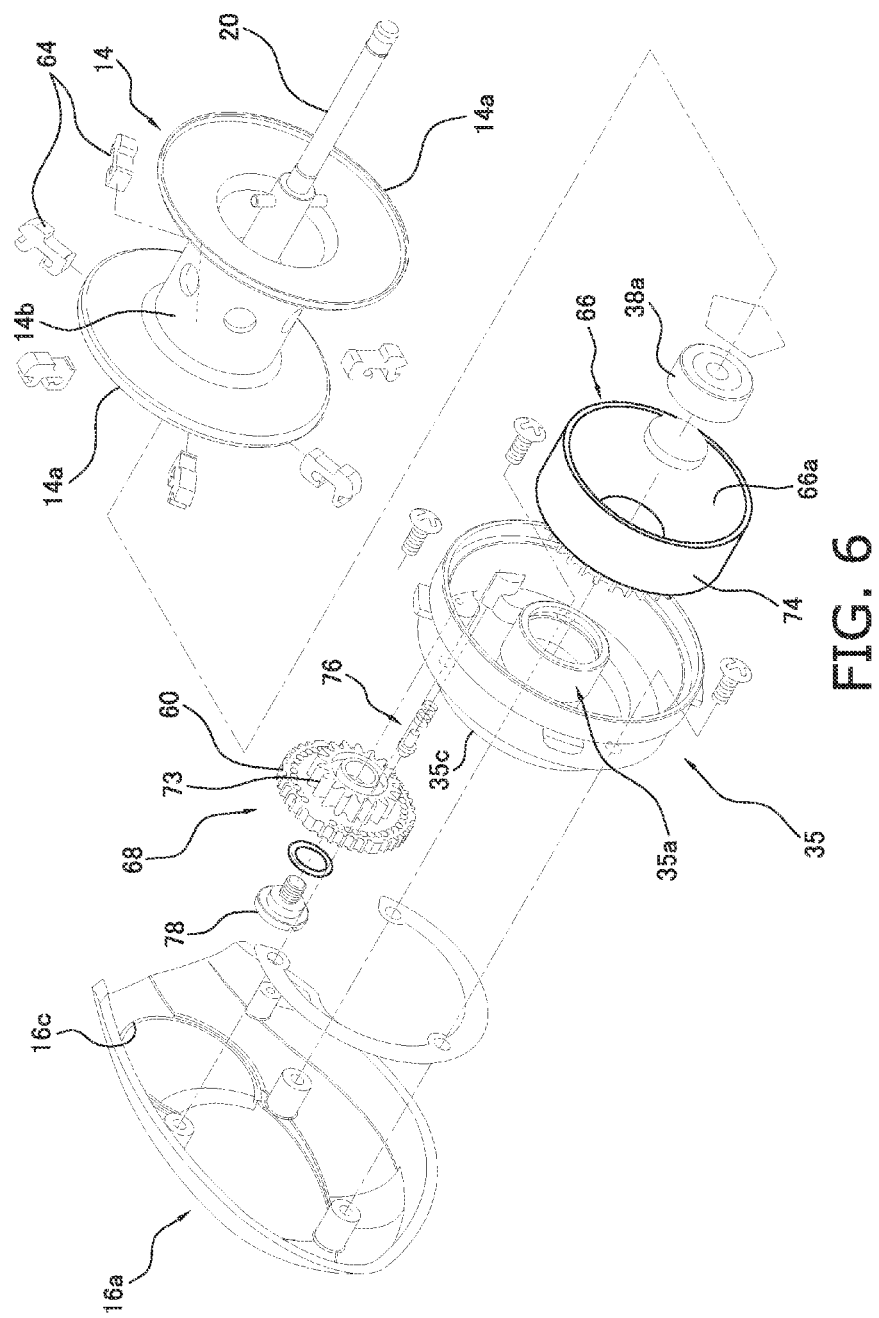
FIG. 6 is an exploded oblique view of the spool braking device.

The spool 14, as shown in FIGS. 4 to 6, is installed between the first side plate 15a and the second side plate 15b. The spool 14 is rotatably supported by the reel body 11. The spool 14 comprises plate-like flange sections 14a on both side parts and a tube-like bobbin trunk 14b between the two flange sections 14a. The spool 14 is integrally and rotatably fixed to the spool shaft 20 that extends through the inner peripheral side of the bobbin trunk 14b. The spool 14 is integrally and rotatably fixed to the spool shaft 20 by, for example, serration bonding.

The spool shaft 20 is, for example, a non-magnetic metal such as SUS304, etc. The spool shaft 20, as shown in FIG. 5, extends outward from the second side cover 16b while penetrating the second side plate 15b. One end (the left end in FIG. 5) of the spool shaft 20 is rotatably supported by an axle bearing housing portion 35a via an axle bearing 38a. The other end (the right end in FIG. 5) of the spool shaft 20 that extends outward from the second side cover 16b is rotatably supported by a boss portion 16d that is formed on the second side cover 16b by the axle bearing 38b. A large-diameter portion 20a is formed in the center part in the axial direction of the spool shaft 20. A clutch pin 21a that configures the clutch mechanism 21 penetrating along the radial direction is installed in the part where the large-diameter portion 20a extends through the second side plate 15b. Both ends of the clutch pin 21a protrude from the outer peripheral surface of the spool shaft 20.

The clutch operating member 17, as shown in FIG. 1, is disposed rearward from the spool 14 in the rear part between the first side plate 15a and the second side plate 15b. The clutch operating member 17 is coupled to the clutch control mechanism 22. The clutch operating member 17 is slidable in the up/down direction between the first side plate 15a and the second side plate 15b. With the sliding of the clutch operating member 17, the clutch mechanism 21 is switched between the coupled state and the cutoff state. The clutch operating member 17 is guided in the up/down direction that approaches and separates from the fishing rod mounting portion 15d by a guide axle (not diagrammed) installed on the spool 14 side of the first side plate 15a.

The gear mechanism 19, as shown in FIG. 5, comprises a drive shaft 30, a drive gear 31 that is fixed to the drive shaft 30, and a tube-like pinion gear 32 that engages with the drive gear 31. The drive shaft 30 is rotatably mounted to the second side plate 15b and the second side cover 16b. The rotation of the drive shaft 30 in the line delivering direction (the reverse rotation) is prohibited by a roller type one-way clutch 50. The one-way clutch 50 is mounted between the second side cover 16b and the drive shaft 30. The drive gear 31 is rotatably mounted to the drive shaft 30 and is coupled to the drive shaft 30 via the drag mechanism 23.

The pinion gear 32 extends in the spool shaft 20 direction while extending through the second side plate 15b. The pinion gear 32 is a tube-like member, the center through which extends the spool shaft 20. The pinion gear 32 is mounted to the second side plate 15b and the second side cover 16b by an axle bearing 52 and an axle bearing 54 rotatably as well as movably in the axial direction. An engaging groove 32a that engages with the clutch pin 21a is formed at one end (the left end in FIG. 5) of the pinion gear 32. This pinion gear 32 and the clutch pin 21a configure the clutch mechanism 21. The pinion gear 32 is moved by the clutch control mechanism 22 to the clutch ON position shown on the upper side of the shaft core C and to the clutch OFF position shown on the lower side of the shaft core C of the spool shaft 20 in FIG. 5.

The clutch control mechanism 22, as shown in FIG. 4, comprises a clutch yoke 45 that moves the pinion gear 32 along the spool shaft 20 direction. When the clutch operating member 17 is operated to the clutch OFF position, the clutch yoke 45 moves the pinion gear 32 to the clutch OFF position. The clutch control mechanism 22 also comprises a clutch return mechanism, which is not diagrammed, that puts the clutch mechanism 21 in the clutch ON position in conjunction with the rotation in the line winding direction of the spool 14.

The spool braking device 25 is for applying the braking force to the spool 14 using centrifugal force. The spool braking device 25 is mounted to the spool shaft 20 and the shaft support portion 35. The spool braking device 25, as shown in FIGS. 4 to 12, comprises a brake drum 66, a rotating member 62, a plurality of (for example, 6) brake shoes 64, a selective fixing member 67, and a moving mechanism 68.

As shown in FIGS. 4 to 6, the brake drum 66 is disposed outward in the radial direction of the brake shoe 64. The brake drum 66 can come into contact with the pivoting brake shoe 64. Specifically, at least a part of the brake drum 66 is disposed outward in the radial direction with respect to the brake shoe 64. More specifically, the brake drum 66 comprises a tapered inner peripheral surface 66a (henceforth, referred to as the tapered surface) that tilts toward the spool 14 (refer to FIG. 6). The tapered surface 66a is formed on the inner peripheral surface of the brake drum 66 outward in the radial direction of the brake shoe 64. The tapered surface 66a is reduced in diameter toward the spool 14. This tapered surface 66a comes into contact with the pivoting brake shoe 64.

The rotating member 62 is, for example, a nearly circular member made from synthetic resin such as polyamide resin, polyacetal resin, etc. The rotating member 62 rotates in conjunction with a rotation in the line delivering direction of the spool 14, for example, the rotation of the spool 14. The rotating member 62 is integrally and rotatably coupled with the spool shaft 20 by an appropriate fixing means, such as a press fitting.

Figure 7:
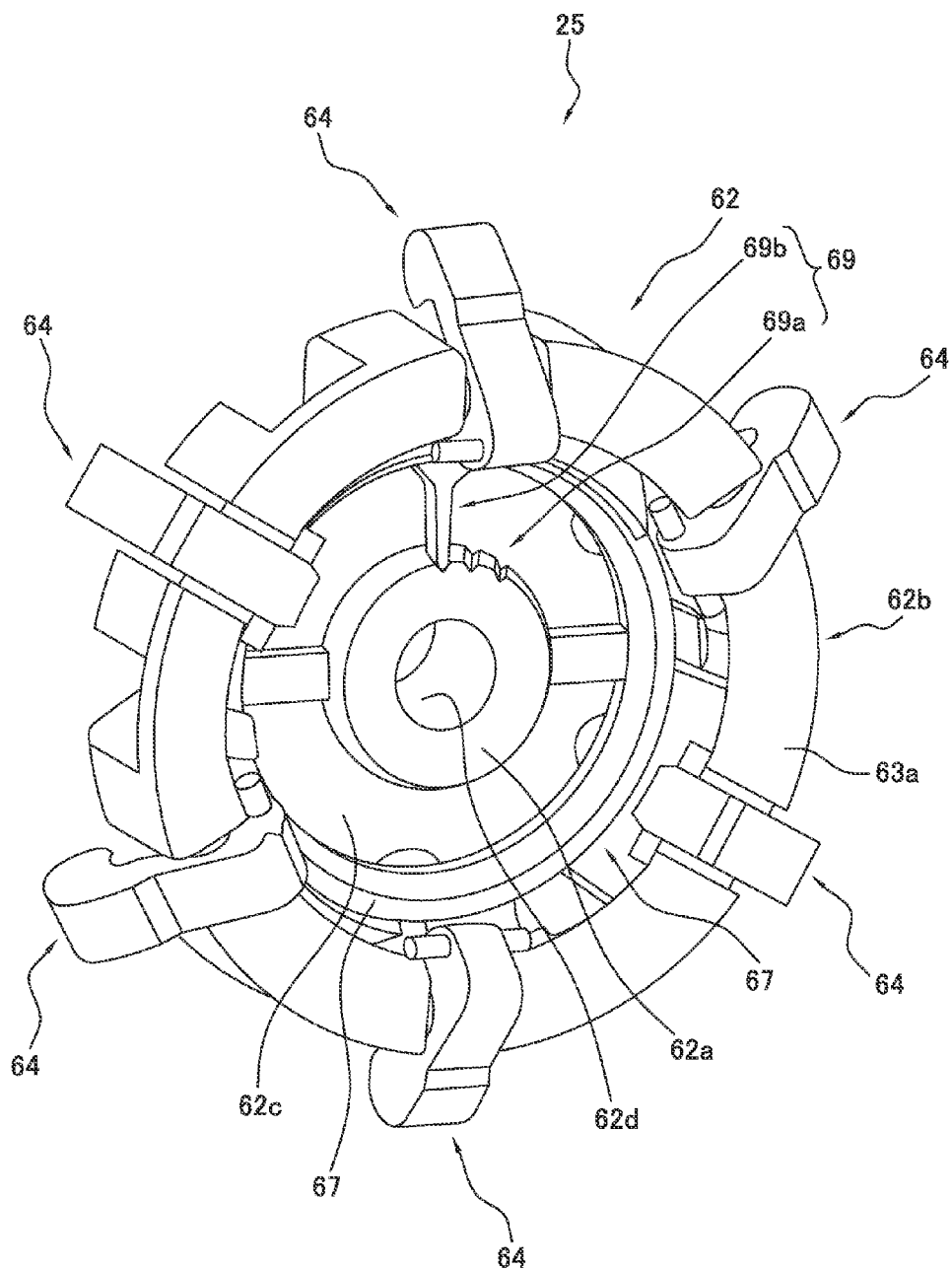
FIG. 7 is an oblique view of the rotating member, the selective fixing member, and the brake shoe.

The rotating member 62, as shown in FIG. 7, comprises a boss portion 62a whose inner peripheral part is fixed to the spool shaft 20, a thick-walled annular shoe attaching portion 62b that is disposed outward in the radial direction of the boss portion 62a, and a connecting portion 62c that connects the boss portion 62a and the shoe attaching portion 62b.

The boss portion 62a is a tube-like section that comprises a through-hole (not diagrammed) with steps that extend through by the spool shaft 20. The through-hole is positioned by the spool shaft 20. The boss portion 62a comprises a positioning recess 69a. Specifically, a positioning recess 69a is formed on the outer peripheral surface of the boss portion 62a. More specifically, three positioning recesses 69a are formed on the outer peripheral portion of the boss portion 62a with predefined spaces in between. The positioning recess 69a and the positioning protrusion 69b mentioned below configure the positioning structure 69. Meanwhile, the positioning structure 69 is a structure for positioning the selective fixing member 67.

Figure 8:
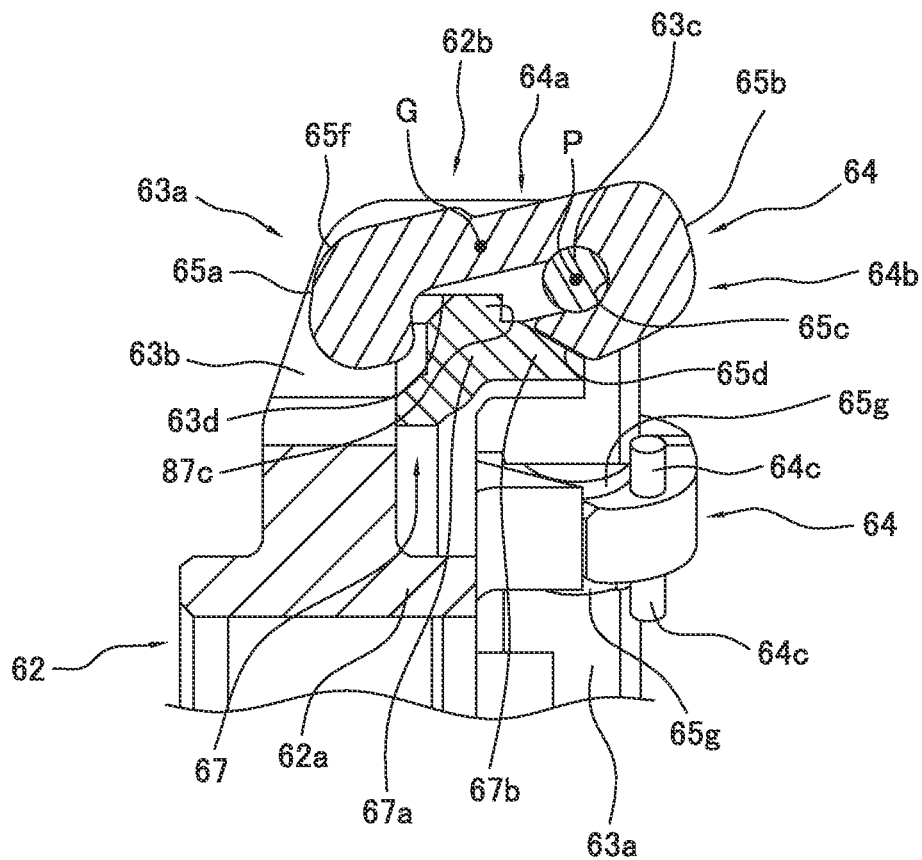
FIG. 8 is a partial cross-sectional diagram of the rotating member, the selective fixing member, and the brake shoe.

As shown in FIG. 7 and FIG. 8, the shoe attaching portion 62b comprises a main body section 63a, a plurality of (for example, 6) shoe supporting recesses 63b that are installed in the main body section 63a, and a plurality of (for example, 6) pivot shaft portions 63c that are installed in the shoe supporting recess 63b.

The main body section 63a is integrally formed on the outer peripheral section of the connecting portion 62c. The main body section 63a (excluding the shoe supporting recess 63b) is essentially formed in a cylindrical shape. A guide recess 63d that guides the selective fixing member 67 (the guide protrusion 87c mentioned below) in the rotating direction is formed on the inner peripheral section of the main body section 63a (refer to FIG. 8). The guide recess 63d is a groove extending in the rotating direction (the circumferential direction).

The shoe supporting recesses 63b are installed with spaces between them in the circumferential direction. The shoe supporting recesses 63b are disposed at equal intervals in the rotating direction of the spool 14. The shoe supporting recesses 63b are formed recessed at a width at which the brake shoe 64 can be disposed. As shown in FIG. 8, the pivot shaft portion 63c pivotally supports the brake shoe 64. The pivot shaft portion 63c extends in a direction that is transverse to the spool shaft 20 and is integrally formed on the shoe supporting recess 63b. The pivot shaft portion 63c is formed in a cylindrical shape.

As shown in FIG. 7, the connecting portion 62c is a thick-walled, disc-like member that is integrally formed on the outer peripheral section of the boss portion 62a. A main body section 63a of the shoe attaching section 62b is integrally formed on the outer peripheral side of the connecting portion 62c.

The brake shoe 64 is a synthetic resin member having elasticity, such as, for example, polyamide resin, etc. As shown in FIG. 7 and FIG. 8, the brake shoe 64 is mounted to the rotating member 62 pivotally around an axis that is transverse to the spool shaft 20. Specifically, the brake shoe 64 is pivotally mounted to the pivot shaft portion 63c of the rotating member 62.

The brake shoe 64 is disposed in the pivot shaft portion 63c in either the pivotal state or the non-pivotal state. More specifically, in the pivotal state, the brake shoe 64 is able to apply the braking force to the spool 14 with centrifugal force. Here, the position where the brake shoe 64 applies the braking force to the spool 14 becomes the braking position (refer to FIG. 7). Additionally, in the non-pivotal state, the brake shoe 64 will not apply the braking force to the spool 14 (non-braking) and allows the rotation of the spool 14. Here, the position where the brake shoe 64 does not apply the braking force to the spool 14 becomes the non-braking position (refer to FIG. 8). The non-pivotal state is realized by the selective fixing member 67 engaging with the brake shoe 64. The engagement between the brake shoe 64 and the selective fixing member 67 will be described later.

As shown in FIG. 8, the brake shoe 64 comprises a main body section 64a, a mounting section 64b that is mounted to the pivot shaft portion 63c, and a wobble stopping section 64c that contacts the main body section 64a and stops the wobbling of the main body section 64a. The main body section 64a comprises a first end 65a and a second end 65b that is on the opposite side of the first end 65a. The main body section 64a is a member that is long in the direction from the first end 65a to the second end 65b. A contacting section 65f that comes into contact with the brake drum 66 is formed on the first end 65a. The contacting section 65f is formed in a circular arc shape.

Additionally, the main body section 64a comprises a pair of boss portions 65g. The boss portion 65g is integrally formed on the main body section 64a so as to protrude outward from the main body section 64a. The boss portion 65g is disposed between the main body section 64a and the wall section of the shoe supporting recess 63b and is slidable to the wall section of the shoe supporting recess 63b of the rotating member 62.

The mounting section 64b is a part where the brake shoe 64 is mounted to the pivot shaft portion 63c. The mounting section 64b is installed on the main body section 64a between the second end 65b and the center of gravity G. The mounting section 64b comprises a C-shaped mounting recess 65c and an engaged section 65d.

The mounting recess 65c is fitted to the pivot shaft portion 63c. For example, the mounting recess 65c is fitted to the pivot shaft portion 63c by clearance fitting. The opening portion of the mounting recess 65c is formed to be a width that is narrower than the diameter of the pivot shaft portion 63c. The engaged section 65d engages with the selective fixing member 67. In particular, the engaged section 65d abuts the engaging section 67b of the selective fixing member 67 mentioned below.

The wobble stopping section 64c is integrally formed on the main body section 64a protruding outward from the main body section 64a. In particular, two wobble stopping sections 64c are integrally formed on both sides of the main body section 64a. The wobble stopping section 64c is slidable to the main body section 63a of the shoe attaching section 62b.

A brake shoe 64 that comprises a configuration such as the above will pivot with the pivoting shaft core P as the center due to the centrifugal force that is applied to the center of gravity G when the spool 14 rotates.

Figure 9:
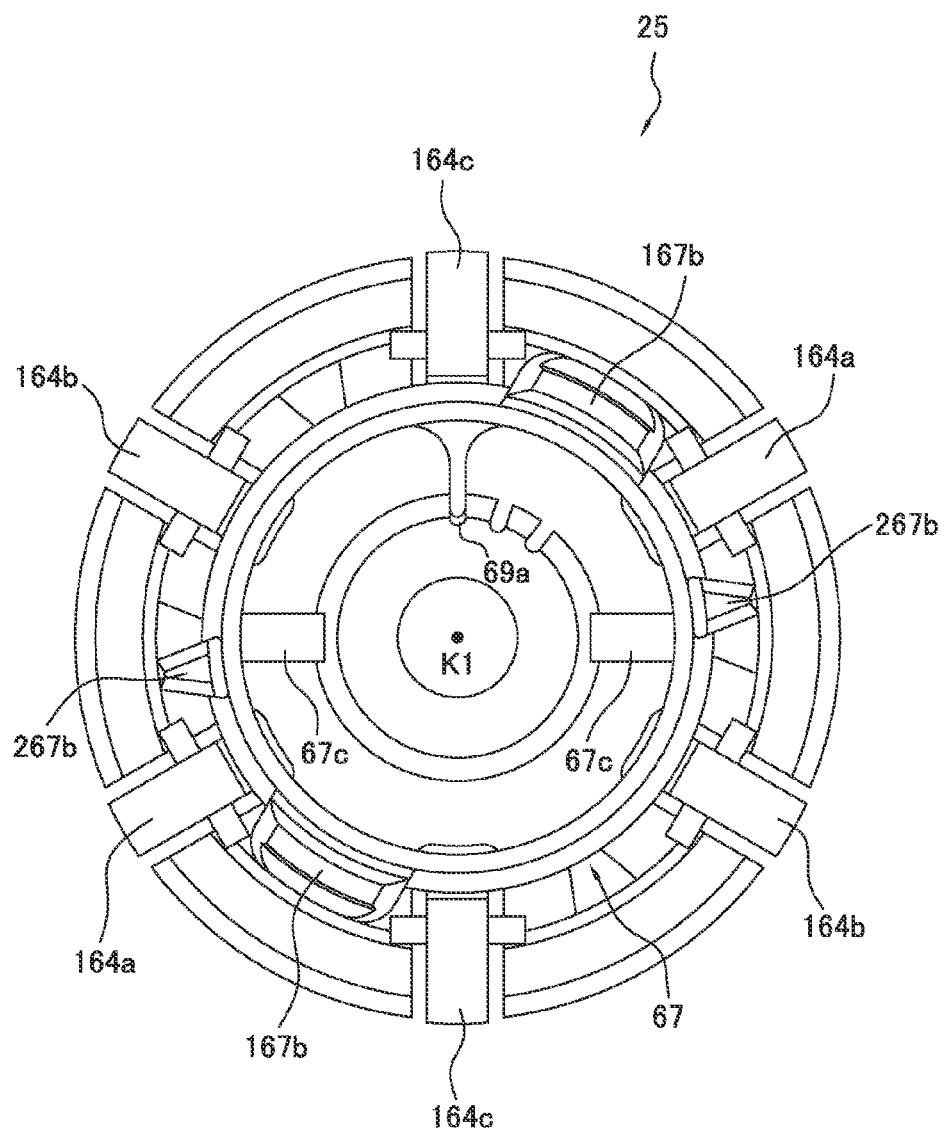
FIG. 9 is a side view of the rotating member, the selective fixing member, and the brake shoe (a non-braking position)
Figure 10:
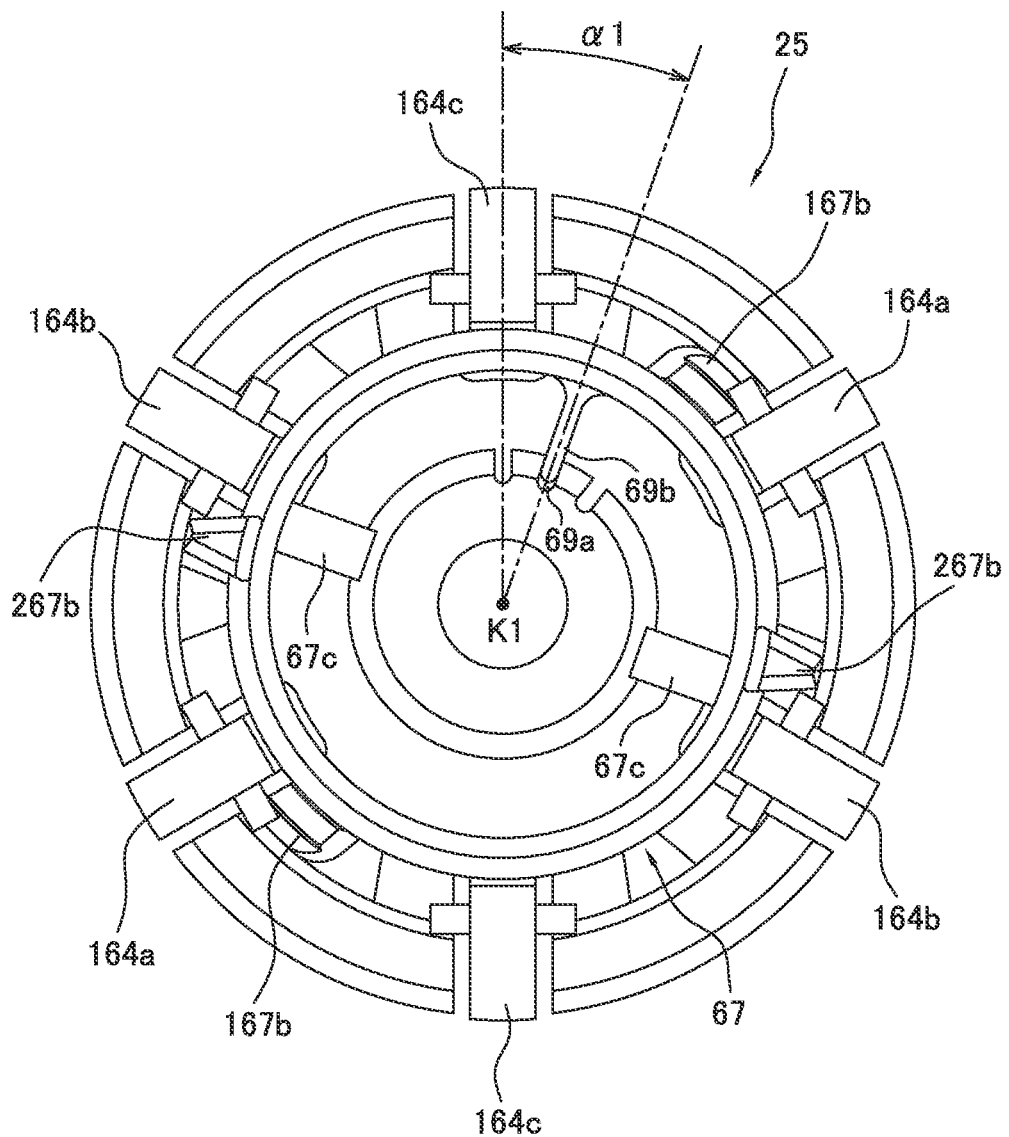
FIG. 10 is a side view of the rotating member, the selective fixing member, and the brake shoe (a first braking state)
Figure 11:
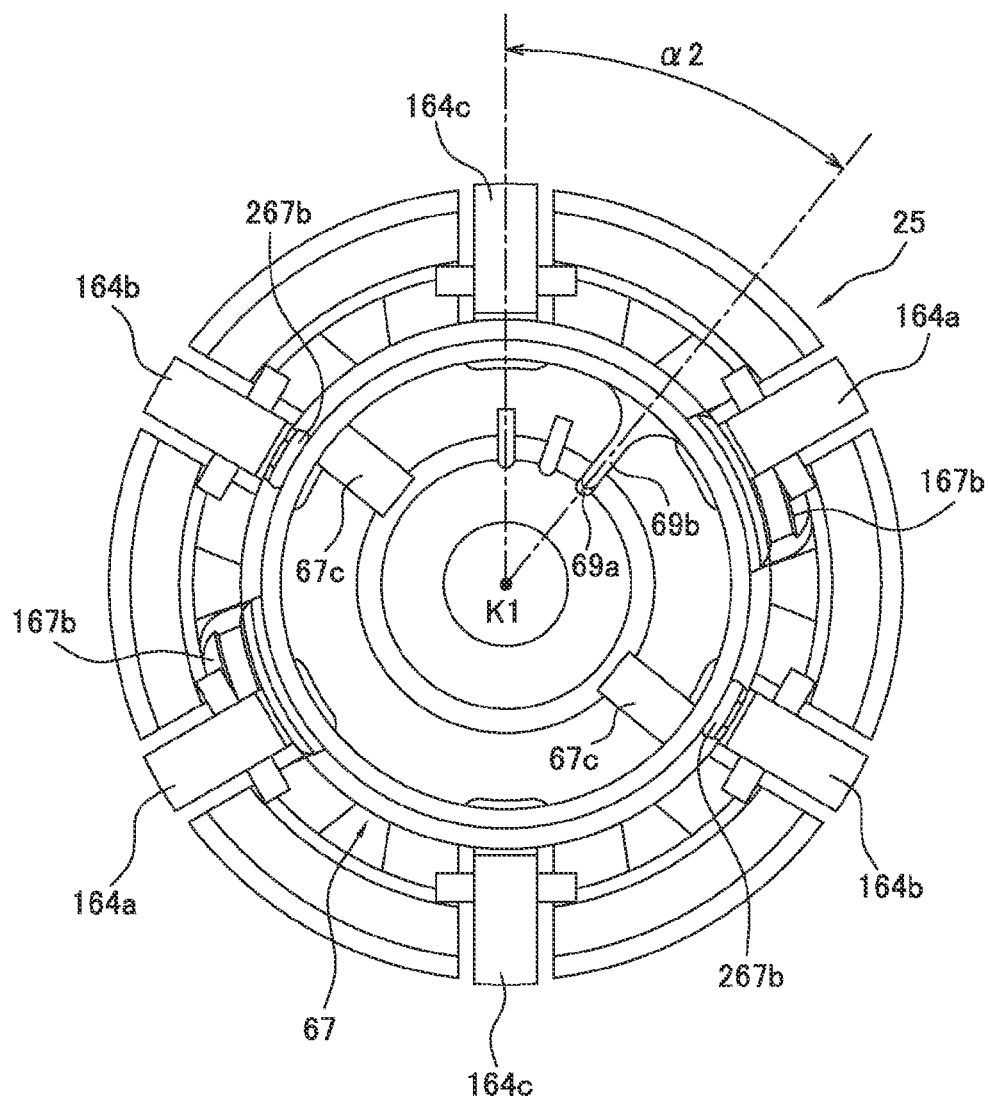
FIG. 11 is a side view of the rotating member, the selective fixing member, and the brake shoe (a second braking state)

In FIGS. 9 to 11, in six brake shoes 64, each of three pairs of brake shoes 64 that oppose each other radially is coded as the first brake shoe 164a, the second brake shoe 164b, and the third brake shoe 164c. The configuration of each of the first brake shoe 164a, the second brake shoe 164b, and the third brake shoe 164c is the same configuration as mentioned above.

As shown in FIG. 7 and FIG. 8, the selective fixing member 67 is mounted to the rotating member 62. In the present example, the selective fixing member 67 is rotatably mounted to the rotating member 62. The selective fixing member 67 can be selectively engaged with the brake shoe 64. For example, the selective fixing member 67 selectively engages with at least one of the first brake shoe 164a and the second brake shoe 164b. The selective fixing member 67, in the case of engaging with a brake shoe 64 (the first brake shoe 164a and/or the second brake shoe 164b), fixes this brake shoe 64 in the non-braking position.

Figure 12:
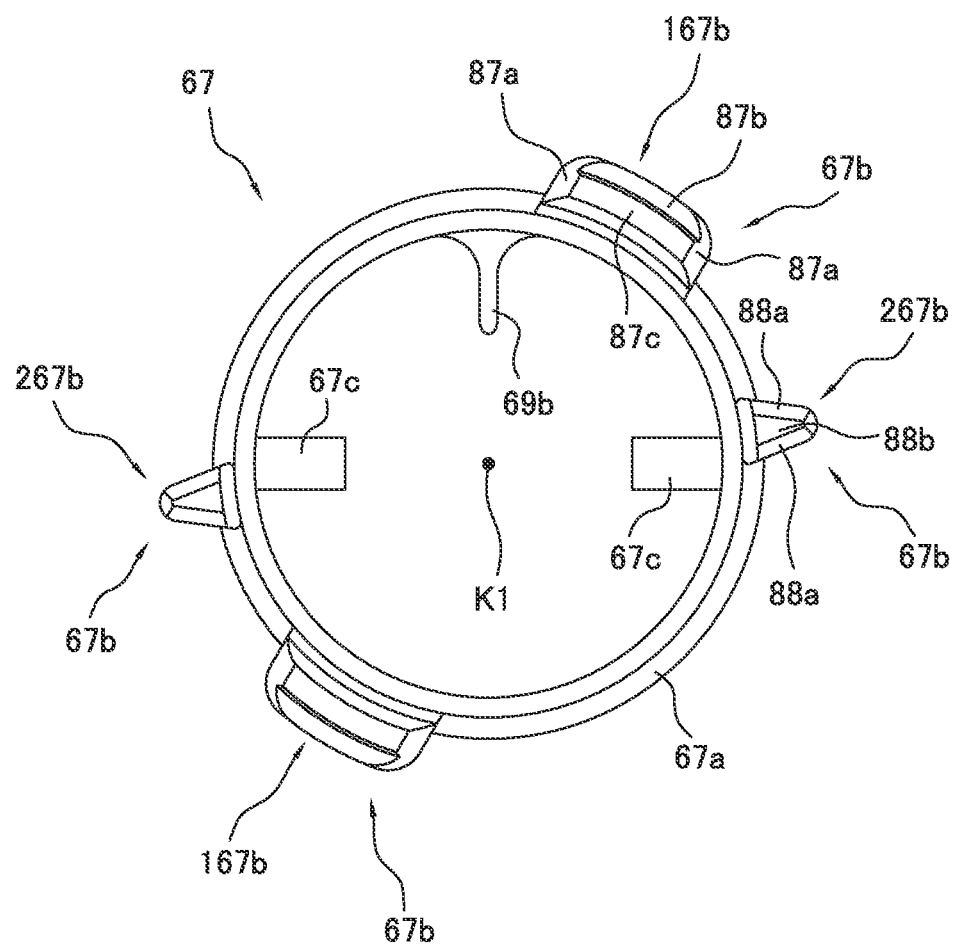
FIG. 12 is a side view of the selective fixing member.

As shown in FIG. 8 and FIG. 12, the selective fixing member 67 comprises a main body section 67a, an engaging section 67b, a positioning protrusion 69b, and a support section 67c. The main body section 67a is rotatably mounted to the rotating member 62. The main body section 67a is disposed on the inner peripheral side of the shoe attaching section 62b. The main body section 67a is formed in an annular shape.

The engaging section 67b is installed on the main body section 67a. In particular, the engaging section 67b is installed on the outer peripheral section of the main body section 67a. In more detail, a plurality of (for example, four) engaging sections 67b are installed on the outer peripheral section of the main body section 67a with spaces in between. The engaging section 67b can selectively engage with at least one of the first brake shoe 164a and the second brake shoe 164b. The engaging section 67b can selectively engage with at least one of the first brake shoe 164a and the second brake shoe 164b according to the rotation amount with respect to the rotating member 62.

In FIG. 12, in four engaging sections 67b, each of two pairs of engaging sections 67b that oppose each other radially is coded as the first engaging section 167b and the second engaging section 267b. Additionally, in FIG. 12, the codes of the detailed description of the first engaging section 167b and the second engaging section 267b shown below are given only to one first engaging section 167b and one second engaging section 267b.

FIG. 9 shows a state in which the two first brake shoes 164a, the two second brake shoes 164b, and the two third brake shoes 164c (the six brake shoes 64) are pivotal. In other words, in this state, the two first engaging sections 167b and the two second engaging sections 267b (the four engaging sections 67b) are disengaged from the first brake shoe 164a, the second brake shoe 164b, and the third brake shoe 164c.

As shown in FIG. 10, the first engaging section 167b can be engaged with the first brake shoe 164a at a predefined first rotation angle α1. Additionally, as shown in FIG. 11, the first engaging section 167b can be engaged with the first brake shoe 164a, and the second engaging section 267b can be engaged with the second brake shoe 164b at a predefined second rotation angle α2. As shown in FIG. 12, the first engaging section 167b is integrally formed on the main body section 67a so that the first engaging section 167b will be longer than the second engaging section 267b in a circumferential direction at the outer peripheral section of the main body section 67a (the direction in which the rotating member rotates).

As shown in FIG. 12, the first engaging section 167b comprises a first shoe guide part 87a (one example of a guide part), a first abutting section 87b, and a guide protrusion 87c. The first shoe guide part 87a is a section that guides the brake shoe 64 to the non-braking position. The first shoe guide part 87a is formed in a tapered shape. In the present example, a pair of first shoe guide parts 87a is formed on both end parts of the first engaging section 167b in the circumferential direction; however, they can be formed on only one end part that touches the brake shoe.

As shown in FIG. 12, the first abutting section 87b is a section that abuts (engages with) the brake shoe 64. As shown in FIG. 12, the first abutting section 87b is formed in the center part of the first engaging section 167b in the circumferential direction. In other words, the first abutting section 87b is formed on the first engaging section 167b between a pair of first shoe guide parts 87a. As shown in FIG. 8, the first abutting section 87b abuts the engaged section 65d of the brake shoe 64 and presses the brake shoe 64 in the radial direction. With this, the brake shoe 64 is positioned in the non-braking position.

As shown in FIG. 8 and FIG. 12, the guide protrusion 87c is a section that engages with the rotating member 62 and is guided in the rotating direction. The guide protrusion 87c is formed protruding outward from the outer peripheral section of the first shoe guide part 87a. The guide protrusion 87c engages with the guide recess 63d (a groove) of the rotating member 62 and is movable in the rotating direction (the circumferential direction). That is, by the guide protrusion 87c being guided by the guide recess 63d, the selective fixing member 67 becomes stably rotatable.

As shown in FIG. 12, the second engaging section 267b can be engaged with the second brake shoe 164b. Specifically, as shown in FIG. 11, the second engaging section 267b can be engaged with the second brake shoe 164b at a predefined second rotation angle α2. More specifically, at a predefined second rotation angle α2, the first engaging section 167b engages with the first brake shoe 164a, and the second engaging section 267b engages with the second brake shoe 164b.

The second engaging section 267b comprises a second shoe guide part 88a (one example of a guide part) and a second abutting section 88b. The second shoe guide part 88a is a section that guides the brake shoe 64 to the non-braking position. The second shoe guide part 88a is formed in a tapered shape. In the present example, a pair of second shoe guide parts 88a is formed on both end parts of the second engaging section 267b in the circumferential direction; however, this can be formed on only one end part that touches the brake shoe.

The second abutting section 88b is a section that abuts (engages with) the brake shoe. As shown in FIG. 12, the second abutting section 88b is formed in the center part of the second engaging section 267b in the circumferential direction. In other words, the second abutting section 88b is formed on the second engaging section 267b between a pair of second shoe guide parts 88a. As shown in FIG. 8, the second abutting section 88b abuts the engaged section 65d of the brake shoe 64 and presses the brake shoe 64 in the radial direction. With this, the brake shoe 64 is positioned in the non-braking position.

As shown in FIGS. 9 to 12, the positioning protrusion 69b is formed on the inner peripheral section of the main body section 67a. Specifically, the positioning protrusion 69b is integrally formed on the main body section 67a protruding inward from the inner peripheral section of the main body section 67a. The tip part of the positioning protrusion 69b engages with one of the three positioning recesses 69a formed on the boss portion 62a. With this, the selective fixing member 67 is positioned with respect to the rotating member 62. In this way, the positioning structure 69 is configured by the positioning protrusion 69b of the selective fixing member 67 and the positioning recess 69a of the rotating member 62.

As shown in FIG. 12, the support section 67c is formed in the inner peripheral section of the main body section 67a. Specifically, the support section 67c is integrally formed on the main body portion 67a protruding inward from the inner peripheral section of the main body section 67a. As shown in FIGS. 9 to 11, the tip part of the support section 67c abuts the outer peripheral section of the boss portion 62a and is slidable along the outer peripheral portion of the boss portion 62a. Here, a plurality of (two) support sections 67c are integrally formed on the main body section 67a. With this support section 67c, the main body section 67a can be stably rotated. Additionally, with this support section 67c, the inward deformation of the main body section 67a can be regulated.

The moving mechanism 68 can move relatively, as well as position the brake shoe 64 and the brake drum 66, to the axial direction of the spool shaft 20. The moving mechanism 68, as shown in FIGS. 3 to 6, comprises an operating member 60, a brake cam 71 (refer to FIG. 4), a first gear member 73 (refer to FIG. 6), and a second gear member 74 that engages with the first gear member 73.

The operating member 60 is, for example, a circular synthetic resin knob and is exposed outside from the first side cover 16a by an opening section 16c that is formed on the first side cover 16a. The operating member 60 is rotatably supported by a screw shaft 78 that is screwed to the outer side surface of a bottom section 35c of the shaft support portion 35. The operating member 60 is capable of being positioned in a plurality of positions (for example, around 40 steps) by a positioning mechanism 76. The first gear member 73 is integrally formed with the operating member 60. The second gear member 74 is integrally and rotatably coupled with the brake drum 66.

As shown in FIG. 4, the brake drum 66 engages with the shaft support portion 35 via a brake cam 71. The brake cam 71 is non-rotatably fixed to the outer peripheral surface of the shaft support portion 35. The brake cam 71 comprises a spiral cam groove 71a. The brake cam 71 (the cam groove 71a) engages with, for example, a plurality of cam protrusions 66c that are formed protruding from the inner peripheral surface of the brake drum 66. With this, when the operating member 60 is rotated in one direction, the brake drum 66 moves in a direction that approaches the spool 14, and the braking force gradually increases. Additionally, if the operating member is rotated in the other direction, the brake drum 66 moves in a direction as so to separate from the spool 14, and the braking force gradually decreases.

With the spool braking device 25, when the operating member 60 is in the operation start position, the contacting section 65f of the brake shoe 64 comes into contact with the small-diameter side of the tapered surface 66a of the brake drum 66. At this time, the pivoting angle of the brake shoe 64 is at its largest, and the pressing force with which the brake drum 66 presses the brake shoe 64 is at its lowest. With this, the braking force that is applied to the spool 14 is at its lowest.

When the operating member 60 is rotated from the operation start position, a first gear member 73 rotates. Then, a second gear member 74 that engages with the first gear member 73 will rotate, and the brake drum 66 will also rotate. Then, the brake drum 66 moves in a direction that approaches the spool 14 via the brake cam 71. At this time, the contacting section 65f of the brake shoe 64 moves to the large-diameter side of the tapered surface 66a. As the large-diameter side 66 approaches the spool 14, the pivoting angle of the brake shoe 64 gradually increases. Then, the pressing force with which the brake drum 66 presses the brake shoe 64 gradually increases. Consequently, the braking force that is applied to the spool 14 gradually increases.

Then, when the operating member 60 is set to the maximum braking position, the pivoting angle of the brake shoe 64 is at its smallest, and the pressing force with which the brake drum 66 presses the brake shoe 64 is maximized. Consequently, the braking force that is applied to the spool 14 is at its greatest.

When operating the operating member 60 from the maximum braking position to the operation start position, contrary to the above, the braking force gradually decreases.

Each of the six brake shoes 64 can be set to the pivotal state and the non-pivotal state according to the rotation amount (the rotation angle) of the selective fixing member 67.

As shown in FIG. 9, when four engaging sections 67b (the first engaging section 167b and the second engaging section 267b) are disengaged from six brake shoes 64 (the first brake shoe 164a, the second brake shoe 164b, and the third brake shoe 164c), the six brake shoes 64 are pivotal.

In this way, in the case that six brake shoes 64 are in a pivotal state, when the rotating member 62 rotates in conjunction with the rotation of the spool 14, the six brake shoes 64 will pivot due to centrifugal force. In particular, when the rotating member 62 rotates, the six brake shoes 64 pivot around the pivot shaft portion 63c. Then, the contacting section 65f of the first end 65a of each brake shoe 64 comes into contact with the tapered surface 66a of the brake drum 66, and the brakes are applied to the rotation of the spool 14.

Here, if the user sets the selective fixing member 67 to the predefined first rotation angle α1 (refer to FIG. 10), the first engaging section 167b of the selective fixing member 67 engages with the first brake shoe 164a. In particular, the first brake shoe 164a is guided by the first shoe guide part 87a that is formed on the first engaging section 167b of the selective fixing member 67. Then, the second end 65b of the first brake shoe 164a abuts the first abutting section 87b that is formed on the first engaging section 167b of the selective fixing member 67. In this way, the first brake shoe 164a is fixed in the non-braking position by the first engaging section 167b of the selective fixing member 67.

In this state, the two first brake shoes 164a are non-pivotal, and the two second brake shoes 164b and the two third brake shoes 164c are pivotal. That is, if the rotating member 62 rotates in this state, the four brake shoes 64 including the two second brake shoes 164b and the two third brake shoes 164c will pivot, and the brakes are applied to the rotation of the spool 14.

In this way, with the user setting the selective fixing member 67 to a predefined first rotation angle α1, the state of the brake shoe 64 shifts from a state in which the six brake shoes 64 (the first brake shoe 164a, the second brake shoe 164b, and the third brake shoe 164c) can pivot to a state in which the four brake shoes 64 (the second brake shoe 164b and the third brake shoe 164c) are pivotal (from the state of FIG. 9 to the state of FIG. 10).

Here, in a state in which the rotating member 62 is stopped, if the user sets the selective fixing member 67 to the predefined second rotation angle α2 (>first rotation angle α1) (refer to FIG. 11), the second engaging section 267b of the selective fixing member 67 engages with the second brake shoe 164b. In particular, the second brake shoe 164b is guided by the second shoe guide part 88a that is formed on the second engaging section 267b of the selective fixing member 67. Then, the second end 65b of the second brake shoe 164b abuts the second abutting section 88b that is formed on the second engaging section 267b of the selective fixing member 67. In this way, the second brake shoe 164b is fixed in the non-braking position by the second engaging section 267b of the selective fixing member 67.

Here, as shown in FIG. 11, in a state in which the second brake shoe 164b is fixed by the second engaging section 267b of the selective fixing member 67, the first brake shoe 164a is also fixed by the first engaging section 167b of the selective fixing member 67. That is, in this state, the two first brake shoes 164a and the two second brake shoes 164b are non-pivotal, and the two third brake shoes 164c are pivotal. If the rotating member 62 rotates in this state, only the two third brake shoes 164c will pivot, and the brakes will be applied to the rotation of the spool 14.

In this way, by rotating the selective fixing member 67, at least one of the first brake shoe 164a and the second brake shoe 164b will be selectively fixed non-pivotally. That is, with the rotation of the selective fixing member 67, the braking force that is applied to the rotation of the spool 14 can be arbitrarily adjusted.

In the present spool braking device 25, the brake shoe 64 can be selectively fixed and made inoperable in the braking position by operating the selective fixing member 67. Additionally, by operating the selective fixing member 67, the brake shoe 64 can be selectively operated and made operable in the non-braking position. In other words, in the present spool braking device 25, the operable state and the inoperable state of the brake shoe 64 can be easily set with the selective fixing member 67.

Specifically, even if the number of brake shoes 64 becomes numerous, the brake shoe 64 can be easily fixed with only the selective fixing member 67. Additionally, even if the brake shoe 64 is a small member, the brake shoe 64 can be easily selected with only the selective fixing member 67. Furthermore, by engaging the selective fixing member 67 with the brake shoe 64, the brake shoe 64 can be reliably fixed to the rotating member 62.

In the present spool braking device 25, by rotating the selective fixing member 67 with respect to the rotating member 62, the brake shoe 64 can be selectively fixed easily. In other words, by rotating the selective fixing member 67 with respect to the rotating member 62, the fixing of the brake shoe 64 can be easily released.

In the present spool braking device 25, by selectively engaging the engaging section 67b of the selective fixing member 67 with at least one of the first brake shoe 164a and the second brake shoe 164b, the brake shoe 64 can be easily made inoperable. Additionally, by disengaging the engaging section 67b of the selective fixing member 67 from at least one of the first brake shoe 164a and the second brake shoe 164b, the brake shoe 64 can be easily made operable.

Since the present spool braking device 25 comprises a positioning structure 69, the selective fixing member 67 can be easily positioned by this positioning structure 69. In other words, the state in which the selective fixing member 67 is engaged with the brake shoe 64 can be reliably maintained.

The present spool braking device 25 comprises a positioning structure 69. The positioning structure 69 comprises a positioning recess 69a and a positioning protrusion 69b. By engaging the positioning protrusion 69b with the positioning recess 69a, the selective fixing member 67 can be easily positioned. In other words, the state in which the selective fixing member 67 is engaged with the brake shoe 64 can be reliably maintained.

In the present spool braking device 25, since the engaging section 67b has a guide part to guide the brake shoe 64 to the non-braking position, in the case that the selective fixing member 67 is operated, the engaging section 67b can be easily engaged with the brake shoe 64.

In the present spool braking device 25, if the selective fixing member 67 engages with the first brake shoe 164a, the first brake shoe 164a is fixed in the non-braking position. Additionally, if the selective fixing member 67 engages with the second brake shoe 164b, the second brake shoe 164b is fixed in the non-braking position. Furthermore, if the selective fixing member 67 engages with the first brake shoe 164a and the second brake shoe 164b, the first brake shoe 164a and the second brake shoe 164b are fixed in the non-braking position. That is, in these cases, the brake shoe 64 is inoperable in the non-braking position. On the other hand, a brake shoe 64, from which the selective fixing member 67 is disengaged, is operable in the braking position. In this way, with the present spool braking device 25, the operable state and the inoperable state of the brake shoe 64 can be easily set by the selective fixing member 67.

In the present spool braking device 25, by engaging the engaging sections 67b (the first engaging section 167b, the second engaging section 267b) individually with the first brake shoe 164a and the second brake shoe 164b, the brake shoe 64 can be easily made inoperable. By releasing the engagement of the engaging sections 67b (the first engaging section 167b, the second engaging section 267b) and the brake shoes 64 (the first brake shoe 164a/the second brake shoe 164b), the brake shoe 64 can be easily made operable.

In the present spool braking device 25, two brake shoes 64 (the first brake shoe 164a/the second brake shoe 164b) can be inoperably fixed simultaneously by one engaging section 67b (the first engaging section 167b). With this, depending on the situation, two engaging sections 67b (the first engaging section 167b, the second engaging section 267b) can be individually engaged with the first brake shoe 164a and the second brake shoe 164b, or both the first brake shoe 164a and the second brake shoe 164b can be simultaneously engaged with just one engaging section 67b (the first engaging section 167b).

In the present spool braking device 25, since the first engaging section 167b is formed to be longer than the second engaging section 267b, even if the selective fixing member 67 is rotated in a state in which, for example, the first engaging section 167b is engaged with the first brake shoe 164a, the second engaging section 267b can be engaged with the second brake shoe 164b while in a state maintaining the engagement between the first engaging section 167b and the first brake shoe 164a.

In the first embodiment, an example was shown of a case where the brake shoe 64 is non-pivotally fixed by rotating the selective fixing member 67. In addition, as shown below, the configuration can be designed so that the brake shoe 64 is non-pivotally fixed by moving a selective fixing member 167 in a direction along the rotational axis of the rotating member 62.

Figure 13:
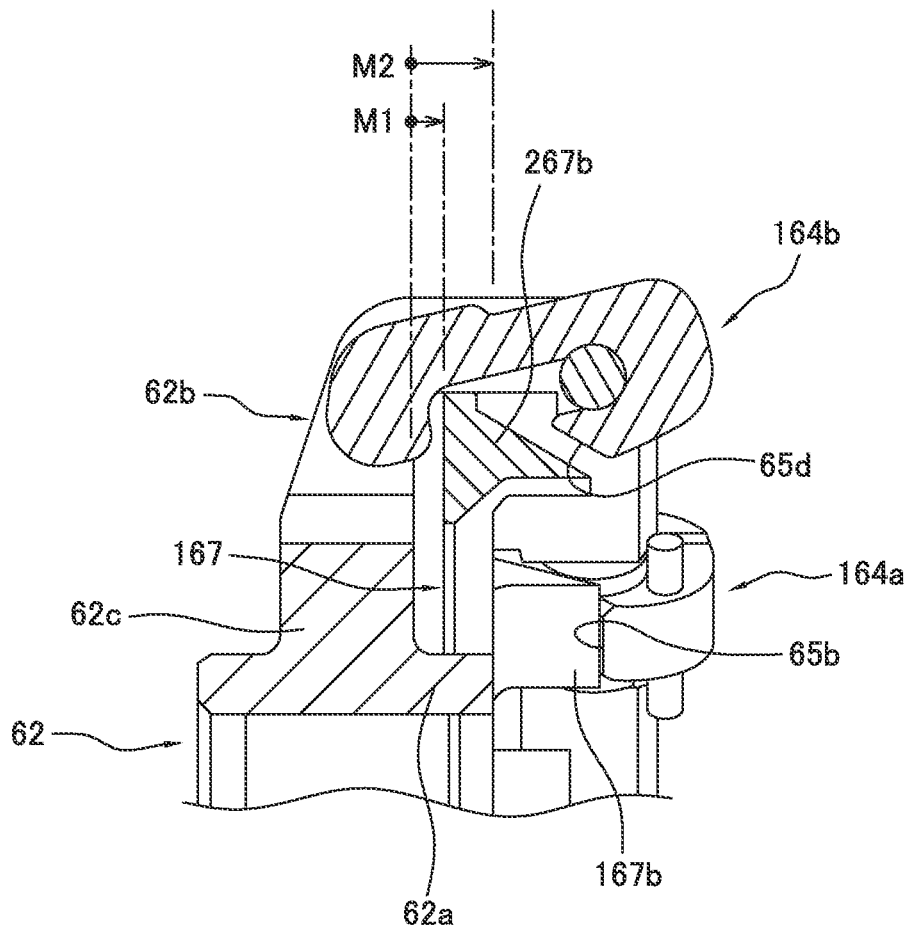
FIG. 13 is a partial cross-sectional diagram of the rotating member, the selective fixing member, and the brake shoe of another embodiment of the first embodiment.

In this case, for example, as shown in FIG. 13, the selective fixing member 167 is disposed between a shoe attaching section 62b and a boss portion 62a in the radial direction. In this state, the selective fixing member 167 is movable in the direction along the rotational axis of the rotating member 62.

Specifically, in a state in which the selective fixing member 167 is abutted with the connecting portion 62c (not diagrammed), all the brake shoes 64 will be pivotal. From this state, if the selective fixing member 167 is moved in a direction along the rotational axis of the rotating member 62 just by a first moving amount M1, as shown in FIG. 13, the first engaging section 167b abuts the engaged section 65d of the first brake shoe 164a. With this, the first brake shoe 164a becomes non-pivotal.

In this state, a gap is formed between the second engaging section 267b of the selective fixing member 167 and the engaged section 65d of the first brake shoe 164a. For this reason, the second brake shoe 164b is pivotal. The third brake shoe 164c is also pivotal.

Additionally, from this state, if the selective fixing member 167 is moved in a direction along the rotational axis of the rotating member 62 by a second moving amount M2 (>first moving amount M1), the second engaging section 267b abuts the engaged section 65d of the second brake shoe 164b. With this, the second brake shoe 164b also becomes non-pivotal. In this state, the third brake shoe 164c is pivotal.

In this way, by moving the selective fixing member 67, at least one of the first brake shoe 164a and the second brake shoe 164b will be selectively fixed non-pivotally. That is, with the movement of the selective fixing member 67, the braking force that is applied to the rotation of the spool 14 can be arbitrarily adjusted.

In the above-described embodiments, an example was shown in which the first brake shoe 164a and the second brake shoe 164b were non-pivotally fixed by the first engaging section 167b and the second engaging section 267b. In addition, a third engaging section (not diagrammed) can be formed on the selective fixing member 67, and the third engaging section can be engaged with the third brake shoe 164c at a predefined rotation amount or a predefined movement amount of the selective fixing member 67. With this configuration, at least one of the first brake shoe 164a, the second brake shoe 164b, and the third brake shoe 164c can be non-pivotally fixed arbitrarily. With this, all the brake shoes can be fixed in the non-braking position. The predefined rotation amount that is set here can be the same as or different from the first rotation angle α1 and/or the second rotation angle α2.

The configuration of the dual-bearing reel of the second embodiment is, primarily, the same as the first embodiment, excluding the configuration of the brake shoe 64, the configuration of the rotating member 62, and the configuration of the selective fixing member 67 of the first embodiment. For this reason, here, regarding the configurations that are the same as the first embodiment, their explanations are omitted, and they are explained using the same reference symbols as the first embodiment. Additionally, in FIG. 14 and FIG. 15 for explaining the second embodiment, the configurations that are the same as the first embodiment are given the same reference symbols. Here, the explanations that are omitted conform to the explanations of the first embodiment.

Figure 14:
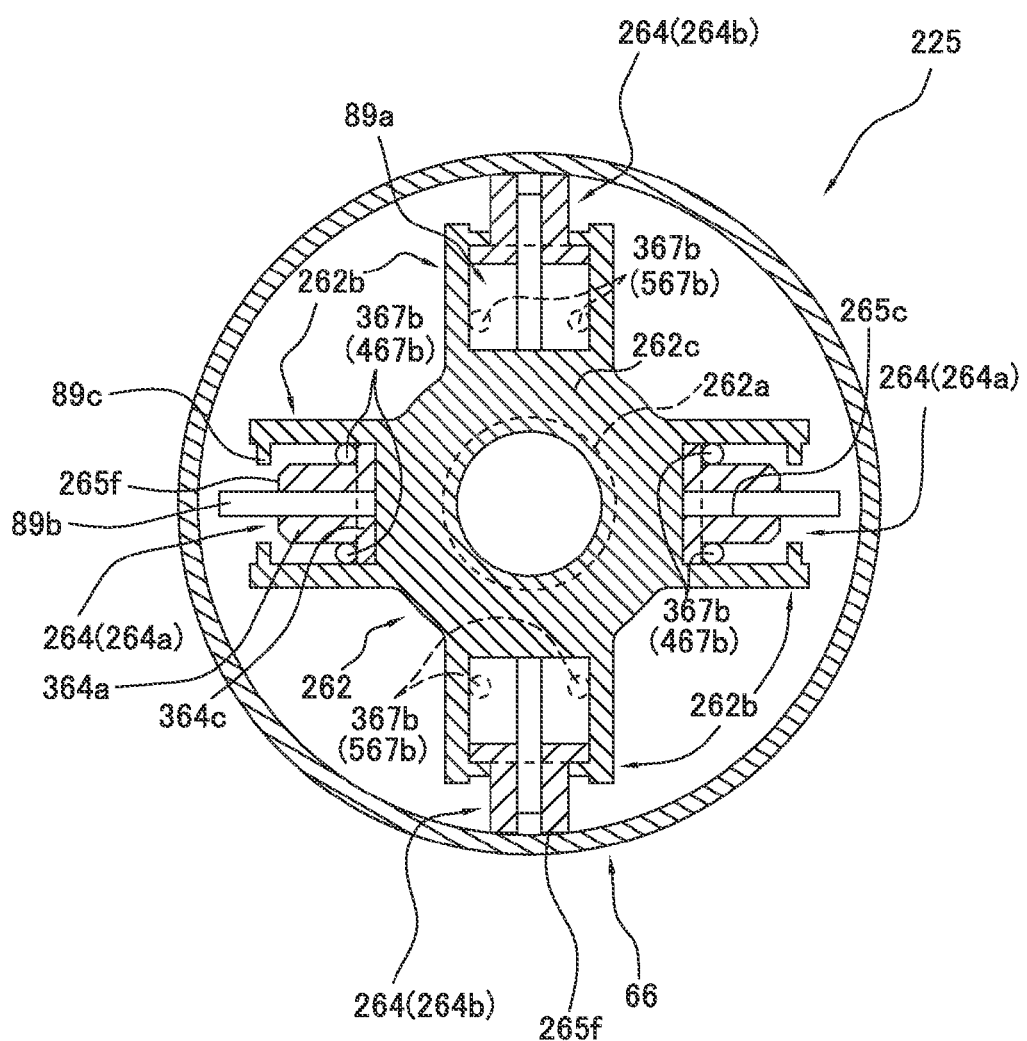
FIG. 14 is a cross-sectional diagram of the spool braking device of the second embodiment of the present invention.
Figure 15:
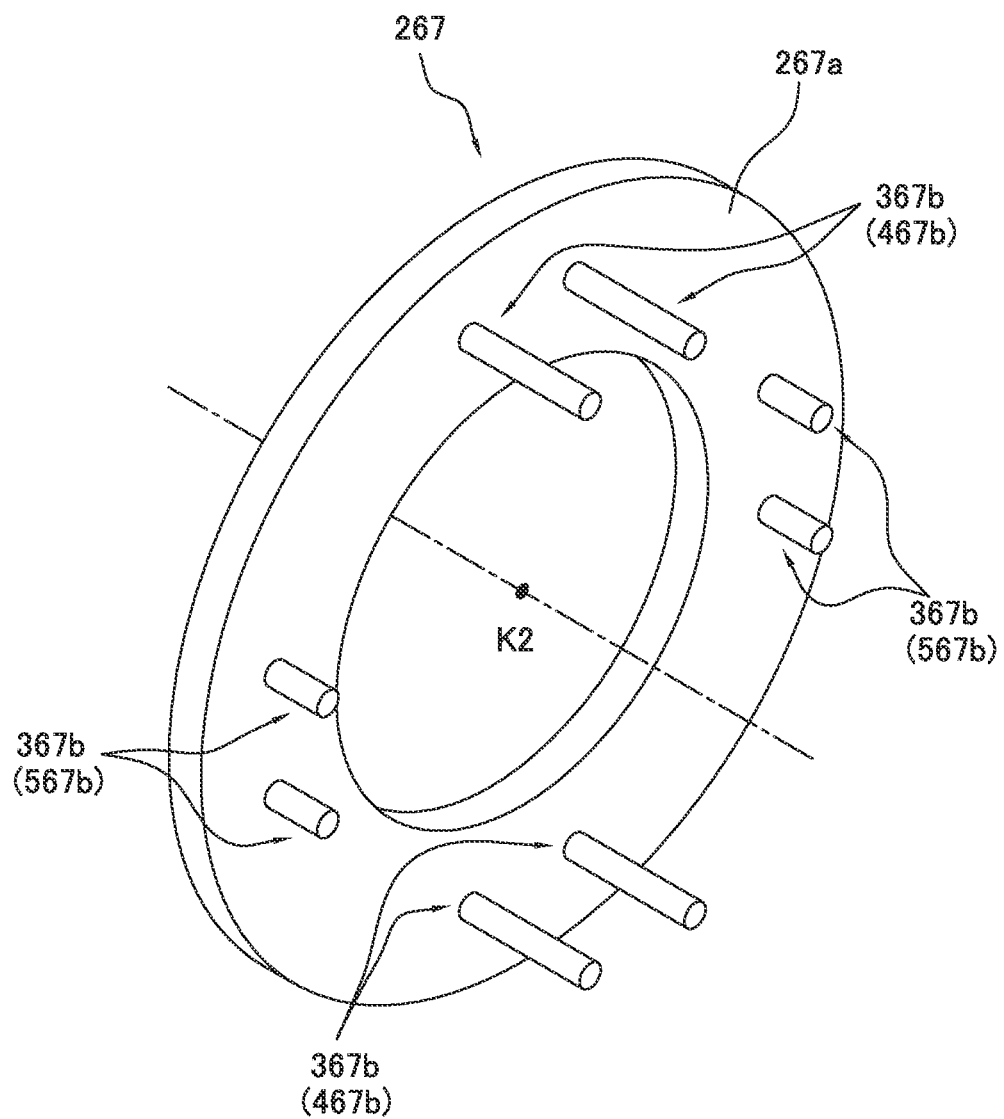
FIG. 15 is an oblique view of the selective fixing member.

The spool braking device 225 is for applying the braking force to the spool 14 using centrifugal force. The spool braking device 225 is mounted to the spool shaft 20 and the shaft support portion 35. The spool braking device 225, as shown in FIG. 14 and FIG. 15, comprises a brake drum 66, a rotating member 262, a plurality of (for example, 4) brake shoes 264, a selective fixing member 267, and a moving mechanism 68. As mentioned above, the explanations for the brake drum 66 and the moving mechanism 68 will be omitted below.

The rotating member 262 rotates in conjunction with a rotation in the line delivering direction of the spool 14, for example, the rotation of the spool 14. The rotating member 262 is integrally and rotatably coupled with the spool shaft 20 by an appropriate fixing means, such as a press fitting.

As shown in FIG. 14, the rotating member 262 comprises a boss portion 262a whose inner peripheral section is fixed to the spool shaft 20, a shoe attaching section 262b that is disposed outward in the radial direction of the boss portion 262a, and a connecting portion 262c that connects the boss portion 262a and the shoe attaching section 262b.

The boss portion 262a is a tube-like section that comprises a through-hole (not diagrammed) with steps that extend through by the spool shaft 20. The through-hole is positioned by the spool shaft 20.

The shoe attaching section 262b is integrally formed on the outer peripheral section of the connecting portion 262c. The shoe attaching section 262b comprises a recess 89a for disposing the brake shoe 264. The recess 89a opens outward with reference to the rotational axis K2 of the rotating member 262 (refer to FIG. 15). A guide axle 89b that guides the brake shoe 264 is installed in the base of the recess 89a. The guide axle 89b movably retains the brake shoe 264 between the braking position and the non-braking position. A pair of mutually opposing protrusions 89c is installed on the wall part of the recess 89a. The pair of protrusions 89c maintains the brake shoe 264 in the braking position.

The connecting portion 262c is a thick-walled, disc-like member that is integrally formed on the outer peripheral section of the boss portion 262a. A shoe attaching section 262b is integrally formed on the outer peripheral side of the connecting portion 262c.

The brake shoe 264 is supported by a rotating member 262 in order to be movable between a braking position where the brakes are applied to the spool 14 with centrifugal force and a non-braking position where a non-braking rotation of the spool 14 is allowed. Specifically, the brake shoe 264 is mounted so as to be freely able to advance and retreat in the radial direction with respect to the guide axle 89b of the rotating member 262.

The brake shoe 264 comprises a main body section 364a and a flange section 364c installed on the main body section 364a. A contacting section 265f that comes into contact with the brake drum 66 is formed on the main body section 364a. Additionally, a hole section 265c is formed on the main body section 364a. The hole section 265c is inserted into the guide axle 89b of the shoe attaching section 262b.

The flange section 364c is integrally formed on the outer peripheral section of the main body section 364a. The flange section 364c protrudes outward from the outer peripheral section of the main body section 364a. The flange section 364c is movable along the wall part of the recess 89a of the shoe attaching section 262b. The flange section 364c can be abutted to the protrusion 89c of the shoe attaching section 262b.

The brake shoe 264 is disposed to the guide axle 89b in either the movable state or the immovable state. In the immovable state, the brake shoe 264 can apply the braking force to the spool 14 by centrifugal force. In this case, when centrifugal force is applied to the brake shoe 264, the brake shoe 264 moves radially outward along the guide axle 89b. Then, the flange section 364c of the brake shoe 264 abuts the protrusion 89c of the shoe attaching section 262b, and the brake shoe 264 is disposed in the braking position. With this, the main body section 364a of the brake shoe 64 abuts the inner peripheral surface of the brake drum 66, and the brakes are applied to the spool 14.

On the other hand, in the immovable state, the brake shoe 264 will not apply the braking force to the spool 14 (non-braking) and allows the rotation of the spool 14. The immovable state is realized by the selective fixing member 267 engaging with the brake shoe 264. In this case, if centrifugal force is applied to the brake shoe 264, the flange section 364c of the brake shoe 264 engages with the engaging section 367b (mentioned below) of the selective fixing member 267. In this state, the brake shoe 264 is immovable along the guide axle 89b. This state is the state in which the brake shoe 264 is disposed in the non-braking position. That is, the main body section 364a of the brake shoe 264 cannot abut the inner peripheral surface of the brake drum 66, and the brakes are not applied to the spool 14.

The brake shoe 264 comprising the above-described configuration comprises a first brake shoe 264a and a second brake shoe 264b. Each of the first brake shoes 264a is mounted to the guide axle 89b of the shoe attaching section 262b so that two first brake shoes 264a are mutually opposed in the radial direction. Additionally, each of the second brake shoes 264b is mounted to the guide axle 89b of the shoe attaching section 262b so that the two second brake shoes 264b are mutually opposed in the radial direction. The first brake shoe 264a and the second brake shoe 264b are also disposed in the circumferential direction (the rotating direction) with a predefined space in between. More specifically, the first brake shoe 264a and the second brake shoe 264b are disposed around a rotational axis K2 with a 90 degree space in between.

The selective fixing member 267 is mounted to the rotating member 262. The selective fixing member 267 is movably mounted to the rotating member 262 in a direction along the rotational axis K2 of the rotating member 262. The selective fixing member 267 can be selectively engaged with the brake shoe 264. With this, the selective fixing member 267 selectively fixes the brake shoe 264 in the non-braking position. For example, the selective fixing member 267 selectively engages with at least one of the first brake shoe 264a and the second brake shoe 264b.

As shown in FIG. 15, the selective fixing member 267 comprises a main body section 267a and an engaging section 367b. The main body section 267a is movable with respect to the rotating member 262. The main body section 267a is formed in an annular shape. The engaging section 367b is installed on the main body section 267a. More specifically, a plurality of (for example, four) engaging sections 367b are integrally installed protruding outward from the main body section 267a with spaces in between. The engaging section 367b can selectively engage with at least one of the first brake shoe 264a and the second brake shoe 264b. The engaging section 367b selectively engages with at least one of the first brake shoe 264a and the second brake shoe 264b according to the moving amount of the main body section 267a with respect to the rotating member 262.

Specifically, in the four engaging sections 367b, each of two pairs of engaging sections 367b that oppose each other radially is coded as the first engaging section 467b and the second engaging section 567b. A pair of first engaging sections 467b and a pair of second engaging sections 567b are formed in a bar shape. A pair of first engaging sections 467b and a pair of second engaging sections 567b are integrally formed on the main body section 267a. In a direction along the rotational axis K2 of the rotating member 262, a pair of first engaging sections 467b is longer than a pair of second engaging sections 567b. With this, in the case that the selective fixing member 267 moves by a predefined first moving amount, the pair of first engaging sections 467b engages with the flange section 364c of the first brake shoe 264a. Additionally, in the case that the selective fixing member 267 moves by a predefined second moving amount, the pair of second engaging sections 567b engages with the flange section 364c of the second brake shoe 264a by a predefined second moving amount.

Each of the four brake shoes 264 can be set to the movable state or the immovable state according to the moving amount of the selective fixing member 267 with respect to the rotating member 262.

In the case that the four brake shoes 264 are in a movable state, when the rotating member 262 rotates in conjunction with the rotation of the spool 14, the four brake shoes 264 move radially outward due to centrifugal force. In particular, when the rotating member 262 rotates, the four brake shoes 264 move radially outward along the guide axle 89b. Then, the contacting section 265f of each brake shoe 264 comes into contact with the inner peripheral surface of the brake drum 66, and the brakes are applied to the rotation of the spool 14.

Here, in a state in which the rotating member 262 is stopped, if the selective fixing member 267 is set to the predefined first movement amount by the user pressing the selective fixing member 267 toward the rotating member 262, as shown in FIG. 14, the first engaging section 467b of the selective fixing member 267 engages with the first brake shoe 264a. In particular, the first engaging section 467b of the selective fixing member 267 engages with the flange section 364c of the first brake shoe 264a. In other words, the flange section 364c of the first brake shoe 264a is disposed between the first engaging section 467b and the base of the recess of the shoe attaching section 262b. With this, the first brake shoe 264a is fixed in the non-braking position by the first engaging section 467b of the selective fixing member 267. In this state, the two first brake shoes 264a are immovable, and the two second brake shoes 264b are movable. That is, if the rotating member 262 rotates in this state, the two second brake shoes 264b move radially outward, and the brakes are applied to the rotation of the spool 14.

Next, in a state in which the rotating member 262 is stopped, if the selective fixing member 267 is set to the predefined second moving amount (>first moving amount) by the user further pressing the selective fixing member 267 toward the rotating member 262, the second engaging section 567b of the selective fixing member 267 engages with the second brake shoe 264b.

In particular, the second engaging section 567b of the selective fixing member 267 engages with the flange section 364c of the second brake shoe 264b. In other words, the flange section 364c of the second brake shoe 264b is disposed between the second engaging section 567b and the base of the recess of the shoe attaching section 262b. With this, the second brake shoe 264b is fixed in the non-braking position by the second engaging section 567b of the selective fixing member 267. In this state, all of the brake shoes 264 (the two first brake shoes 264a and the two second brake shoes 264b) are immovable. That is, even if the rotating member 262 rotates in this state, the brakes are not applied to the rotation of the spool 14.

In this way, by moving the selective fixing member 267, the first brake shoe 264a and/or the second brake shoe 264b will be arbitrarily fixed non-pivotally. That is, with the movement of the selective fixing member 267, the braking force that is applied to the rotation of the spool 14 can be easily adjusted.

In the present spool braking device 225, by moving the selective fixing member 267 in a direction along the rotational axis of the rotating member 262, the brake shoe 264 can be selectively fixed easily. In other words, by moving the selective fixing member 267 in a direction along the above-described rotational axis K2 with respect to the rotating member 262, the fixing of the brake shoe 264 can be easily released.

In the present spool braking device 225, the engaging sections 467b and 567b can be selectively engaged with at least one of the first brake shoe 264a and the second brake shoe 264b, according to the moving amount with respect to the rotating member 262. For this reason, for example, in the case of a predefined first movement amount, the engaging sections 467b and 567b can be engaged with either the first brake shoe 264a or the second brake shoe 264b. Additionally, in the case of a predefined second movement amount, the engaging sections 467b and 567b can be engaged with both the first brake shoe 264a and the second brake shoe 264b simultaneously. In this way, by rotating the selective fixing member 267 with respect to the rotating member 262, the brake shoe 264 can be selectively fixed easily. In other words, by moving the selective fixing member 267 with respect to the rotating member 262, the fixing of the brake shoe 264 can be easily released.

In the present spool braking device 225, since the first engaging section 467b is formed to be longer than the second engaging section 567b, for example, even if the selective fixing member 267 is moved in a state in which the first engaging section 467b is engaged with the first brake shoe 264a, the second engaging section 567b can be engaged with the second brake shoe 264b while in a state maintaining the engagement between the first engaging section 467b and the first brake shoe 264a.

In the above-described second embodiment, an example was shown of a case in which the four brake shoes (the first brake shoe 264a and the second brake shoe 264b) were immovably fixed in two steps with the four pairs of engaging sections (the first engaging section 467b and the second engaging section 567b). Alternatively, the configuration can be designed so that the four brake shoes 264a and 264b are immovably fixed in four steps with each of the four pairs of engaging sections 467b and 567b. For example, by setting each length of the four pairs of engaging sections 467b and 567b so that they are all different lengths, the four brake shoes 264a and 264b can be immovably fixed in four steps. With this, the brakes can be more finely applied to the rotation of the spool 14.

Figure 16:
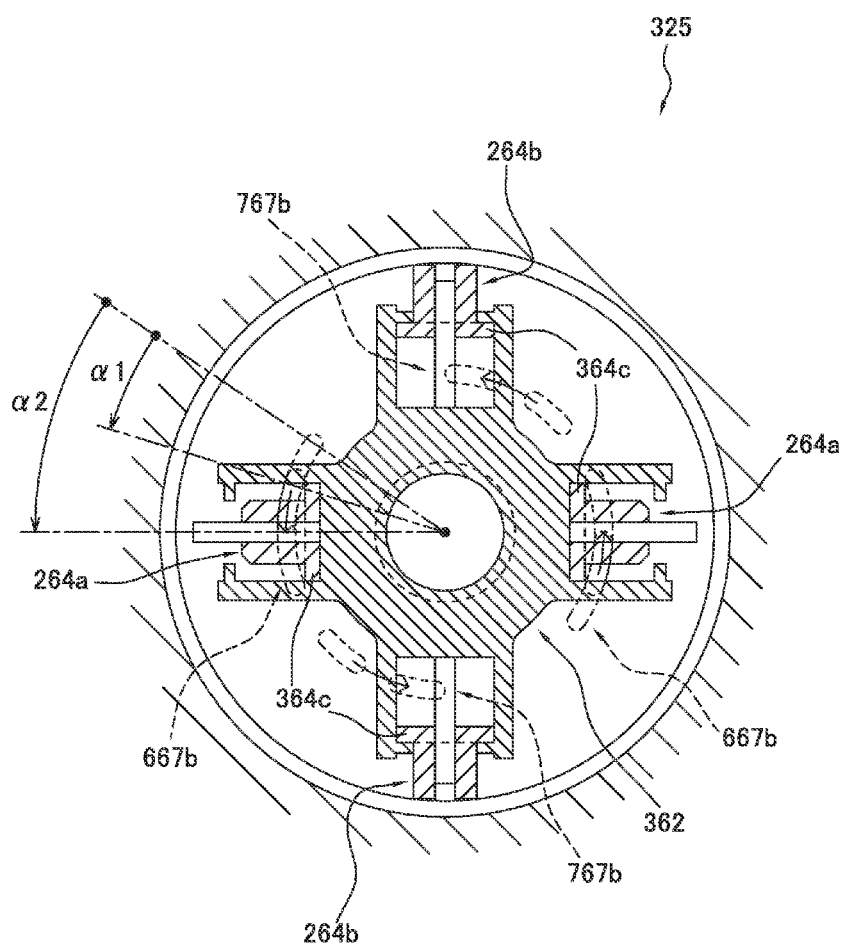
FIG. 16 is a cross-sectional diagram of the spool braking device of another embodiment of the second embodiment.

In the above-described second embodiment, an example was shown of a case in which the engaging sections 467b and 567b of the selective fixing member 267 are engaged with the flange section 364c of the brake shoe 264 by moving the selective fixing member 267 in a direction along the rotational axis of the rotating member 262. Alternatively, the configuration can be designed so that engaging sections 667b and 767b of a selective fixing member 367 are engaged with the flange section 364c of the brake shoe 264 by rotating the selective fixing member 367 around the rotational axis K2 of a rotating member 362, as shown in FIG. 16 and FIG. 17.

In this case, the selective fixing member 367 of a spool braking device 325 comprises a main body section 367a and engaging sections 667b and 767b. The main body section 367a is movable with respect to the rotating member 362. The main body section 367a is formed in an annular shape. Plural (for example, four) engaging sections 667b and 767b are integrally formed protruding outward from the main body section 367a with spaces in between. The engaging sections 667b and 767b can be selectively engaged with at least one of the first brake shoe 264a and the second brake shoe 264b according to the rotating amount of the main body section 367a with respect to the rotating member 362.

Figure 17:
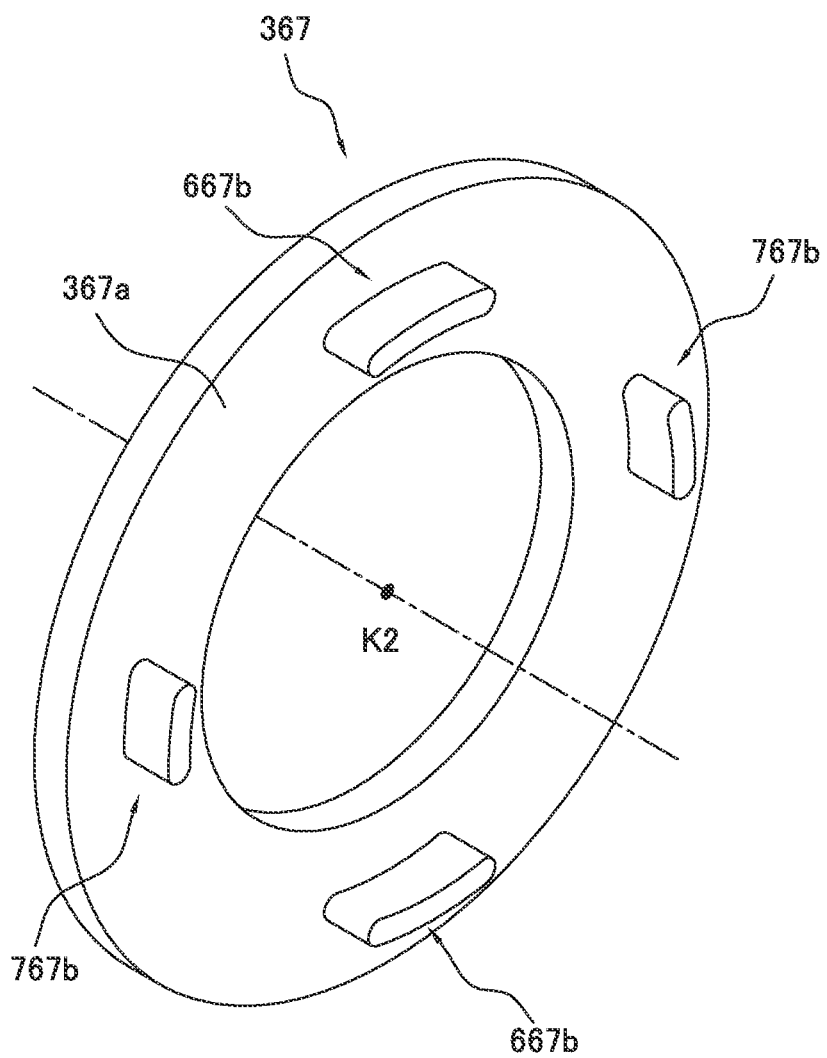
FIG. 17 is an oblique view of the selective fixing member.

In FIG. 17, in the four engaging sections 667b and 767b, each of two pairs of engaging sections that oppose each other radially is coded as the first engaging section 667b and the second engaging section 767b. A pair of first engaging sections 667b and a pair of second engaging sections 767b are integrally formed on the main body section 367a protruding from the main body section 367a. In the rotating direction of the rotating member 262, a pair of first engaging sections 667b is longer than a pair of second engaging sections 767b. With this, as shown in FIG. 16, if the selective fixing member 367 is set to a first rotation angle α1, the pair of first engaging sections 667b engages with the flange section 364c of the first brake shoe 264a. Additionally, if the selective fixing member 367 is set to a second rotation angle α2, the pair of second engaging sections 767b engages with the flange section 364c of the second brake shoe 264b in a state in which the pair of first engaging sections 667b is engaged with the flange section 364c of the first brake shoe 264a.

Even if configured in this way, at least one of the first brake shoe 264a and the second brake shoe 264b can be selectively engaged with the selective fixing member 367, according to the rotation amount of the selective fixing member 367.

The present invention is widely applicable to dual-bearing reel spool braking devices.

What is claimed is:

1. A dual-bearing reel spool braking device configured to apply braking force to a spool that is rotatably mounted on a reel body by centrifugal force, the dual-bearing reel spool braking device comprising:
   a rotating member configured to rotate in conjunction with the rotation of the spool;
   a brake shoe supported by the rotating member so as to be pivotal between a braking position to brake the spool with centrifugal force and a non-braking position to enable non-braking rotation of the spool;
   a brake drum configured to be selectively contacted with the brake shoe; and
   a selective fixing member mounted to the rotating member, and being configured to selectively fix the brake shoe to the non-braking position by selectively engaging with the brake shoe.

2. The dual-bearing reel spool braking device as recited in claim 1, wherein
   the selective fixing member is rotatably mounted to the rotating member.

3. The dual-bearing reel spool braking device as recited in claim 2, wherein
   the selective fixing member comprises a main body section mounted to the rotating member and an engaging section installed on the main body section and configured to be selectively engaged with the brake shoe.

4. The dual-bearing reel spool braking device as recited in claim 1, wherein
   the selective fixing member is movably mounted to the rotating member in a direction along the rotational axis of the rotating member.

5. The dual-bearing reel spool braking device as recited in claim 4, wherein
   the selective fixing member comprises a main body section mounted to the rotating member and an engaging section installed on the main body section and configured to be selectively engaged with the brake shoe.

6. The dual-bearing reel spool braking device as recited in claim 1, wherein
   the selective fixing member comprises a main body section mounted to the rotating member and an engaging section disposed on the main body section and configured to be selectively engaged with the brake shoe.

7. The dual-bearing reel spool braking device as recited in claim 6, wherein
   the brake shoe comprises a first brake shoe and a second brake shoe,
   and the selective fixing member selectively engages at least one of the first brake shoe and the second brake shoe.

8. The dual-bearing reel spool braking device as recited in claim 7, wherein
   the engaging section includes a first engaging section and a second engaging section,
   the first engaging section is configured to engage at least one of the first brake shoe and the second brake shoe,
   and the second engaging section is configured to engage at least the other of the first brake shoe and the second brake shoe.

9. The dual-bearing reel spool braking device as recited in claim 8, wherein
   the first engaging section is configured to engage with both the first brake shoe and the second brake shoe.

10. The dual-bearing reel spool braking device as recited in claim 8, wherein
    the first engaging section is longer than the second engaging section in a direction that the rotating member rotates.

11. The dual-bearing reel spool braking device recited in claim 8, wherein
    the first engaging section is longer than the second engaging section in a direction along the rotational axis.

12. The dual-bearing reel spool braking device as recited claim 1, further comprising
    a positioning structure configured to position the selective fixing member with respect to the rotating member.

13. The dual-bearing reel spool braking device as recited in claim 12, wherein
    the positioning structure comprises a positioning recess disposed on either the rotating member or the selective fixing member and a positioning protrusion disposed on the other of the rotating member of the selective fixing member, and configured to engage with the positioning recess.

14. The dual-bearing reel spool braking device as recited in claim 1, wherein
    the selective fixing member comprises a guide part configured to guide the brake shoe to the non-braking position.

* * * * *